US012112022B2

(12) United States Patent
Koya et al.

(10) Patent No.: US 12,112,022 B2
(45) Date of Patent: Oct. 8, 2024

(54) USER INTERFACE AUGMENTATION SYSTEM, USER INTERFACE AUGMENTATION METHOD, AND USER INTERFACE AUGMENTATION PROGRAM

(71) Applicant: Nippon Telegraph and Telephone Corporation, Tokyo (JP)

(72) Inventors: Hidetaka Koya, Musashino (JP);
Makoto Komiyama, Musashino (JP);
Akira Kataoka, Musashino (JP);
Kimio Tsuchikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/038,354

(22) PCT Filed: Nov. 27, 2020

(86) PCT No.: PCT/JP2020/044397
§ 371 (c)(1),
(2) Date: May 23, 2023

(87) PCT Pub. No.: WO2022/113315
PCT Pub. Date: Jun. 2, 2022

(65) Prior Publication Data
US 2024/0004528 A1  Jan. 4, 2024

(51) Int. Cl.
*G06F 3/048* (2013.01)
*G06F 3/0484* (2022.01)

(52) U.S. Cl.
CPC .................. *G06F 3/0484* (2013.01)

(58) Field of Classification Search
CPC ..................................................... G06F 3/048
See application file for complete search history.

(56) References Cited

U.S. PATENT DOCUMENTS

| 7,596,766 | B1 * | 9/2009 | Sharma ................. | G06F 3/0481 715/713 |
| 8,977,946 | B2 * | 3/2015 | Sato ....................... | G06T 11/60 715/204 |
| 11,508,131 | B1 * | 11/2022 | Clemens ............... | H04N 13/279 |
| 11,740,758 | B1 * | 8/2023 | Francis ................. | G06F 3/0484 715/757 |
| 2004/0174818 | A1 * | 9/2004 | Zocchi ................... | G01R 13/28 370/241 |
| 2005/0273700 | A1 * | 12/2005 | Champion ........... | G06F 3/04883 715/764 |

(Continued)

FOREIGN PATENT DOCUMENTS

| JP | 2006350490 | 12/2006 |
| JP | 2015035120 | 2/2015 |

(Continued)

*Primary Examiner* — Linh K Pham
(74) *Attorney, Agent, or Firm* — Fish & Richardson P.C.

(57) ABSTRACT

A user interface augmentation system includes a memory and a processor coupled to the memory. The processor is configured to perform operations including: searching a system screen for a base point UI serving as a base point for display of an additional user interface (UI) to be added to the system screen; displaying a new screen with a transparent background in such a way as to overlap the system screen; and displaying the additional UI at a position based on the base point UI on the new screen.

7 Claims, 19 Drawing Sheets

(56) References Cited

U.S. PATENT DOCUMENTS

| | | | | |
|---|---|---|---|---|
| 2006/0059432 A1* | 3/2006 | Bells | ............. | G09G 5/14 |
| | | | | 715/768 |
| 2008/0215999 A1* | 9/2008 | Kim | ............. | H04M 1/724 |
| | | | | 715/762 |
| 2009/0138811 A1* | 5/2009 | Horiuchi | ............. | G09G 5/14 |
| | | | | 715/768 |
| 2009/0217182 A1 | 8/2009 | Grechanik et al. | | |
| 2010/0070851 A1* | 3/2010 | Chen | ............. | G06F 16/986 |
| | | | | 715/236 |
| 2013/0120444 A1* | 5/2013 | Allyn | ............. | G06F 9/451 |
| | | | | 345/629 |
| 2013/0231157 A1* | 9/2013 | Chung | ............. | H04M 1/0264 |
| | | | | 455/556.1 |
| 2014/0198112 A1* | 7/2014 | Miyamoto | ............. | G06T 11/00 |
| | | | | 345/522 |
| 2014/0228120 A1* | 8/2014 | Hong | ............. | A63F 13/80 |
| | | | | 463/30 |
| 2015/0046857 A1 | 2/2015 | Kihara | | |
| 2015/0062175 A1* | 3/2015 | Kim | ............. | G06F 3/04886 |
| | | | | 345/639 |
| 2018/0189073 A1 | 7/2018 | Larabie-Belanger | | |
| 2019/0146814 A1 | 5/2019 | Larabie-Belanger | | |
| 2020/0225737 A1* | 7/2020 | Limor | ............. | G06T 15/60 |
| 2020/0322583 A1* | 10/2020 | Matsuki | ............. | G09G 3/20 |

FOREIGN PATENT DOCUMENTS

| | | |
|---|---|---|
| JP | 2017072872 | 4/2017 |
| JP | 2018005344 | 1/2018 |
| JP | 2020074096 | 5/2020 |

* cited by examiner

Fig. 2
UI AUGMENTATION ACCORDING TO IMPLEMENTATION EXAMPLE
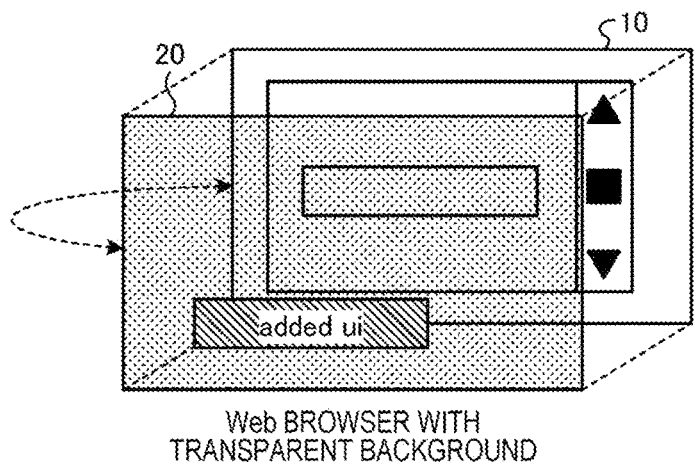
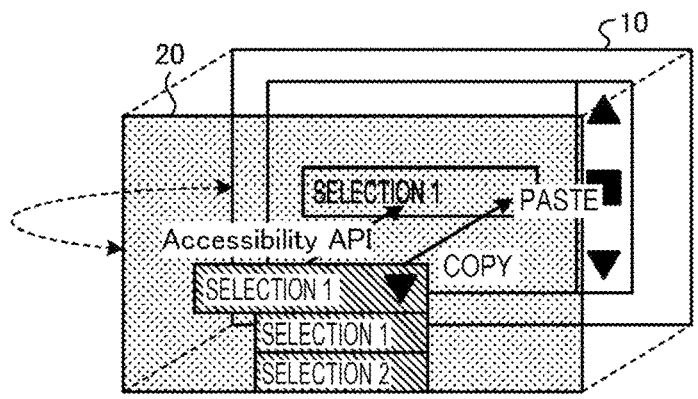

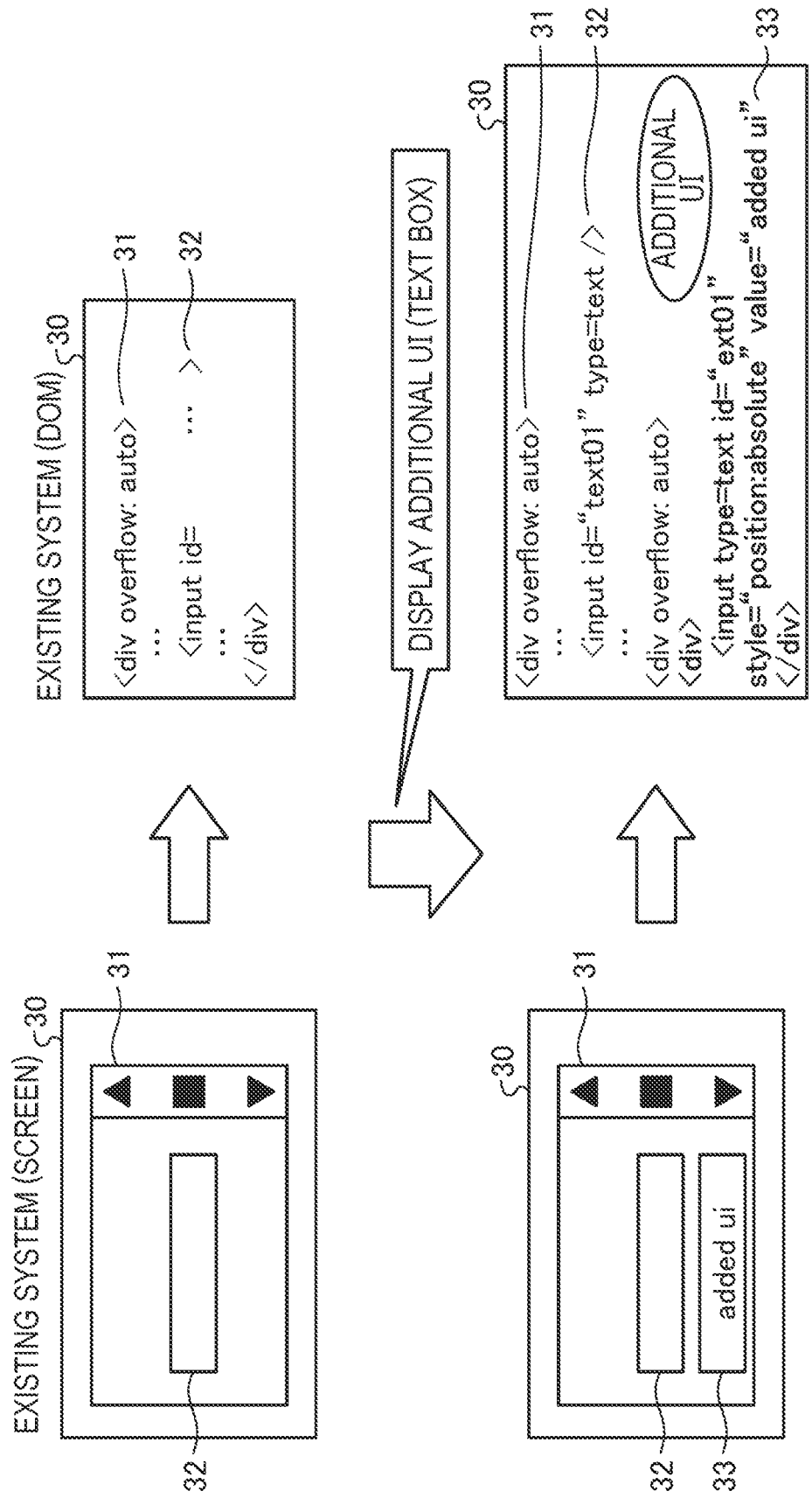

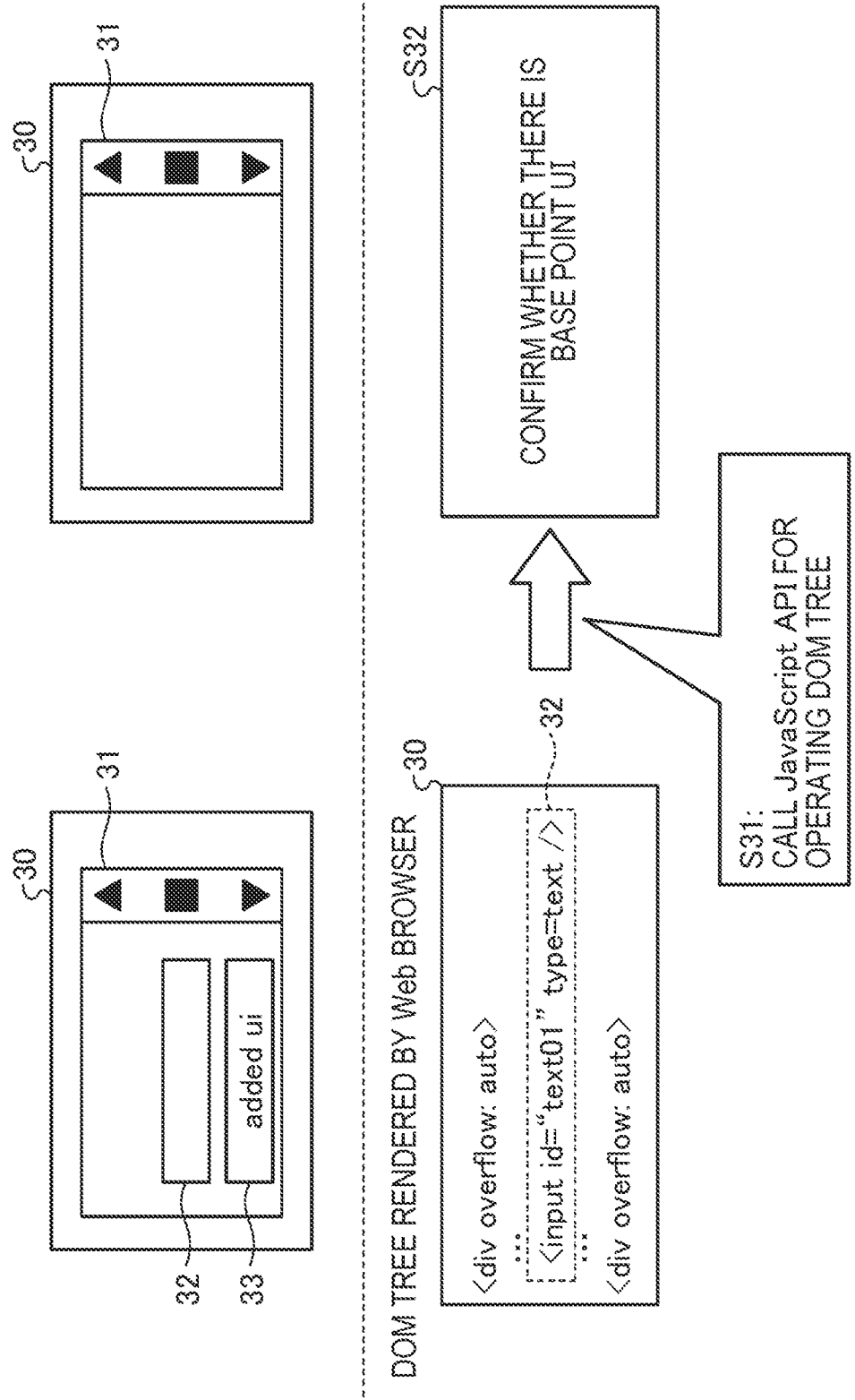

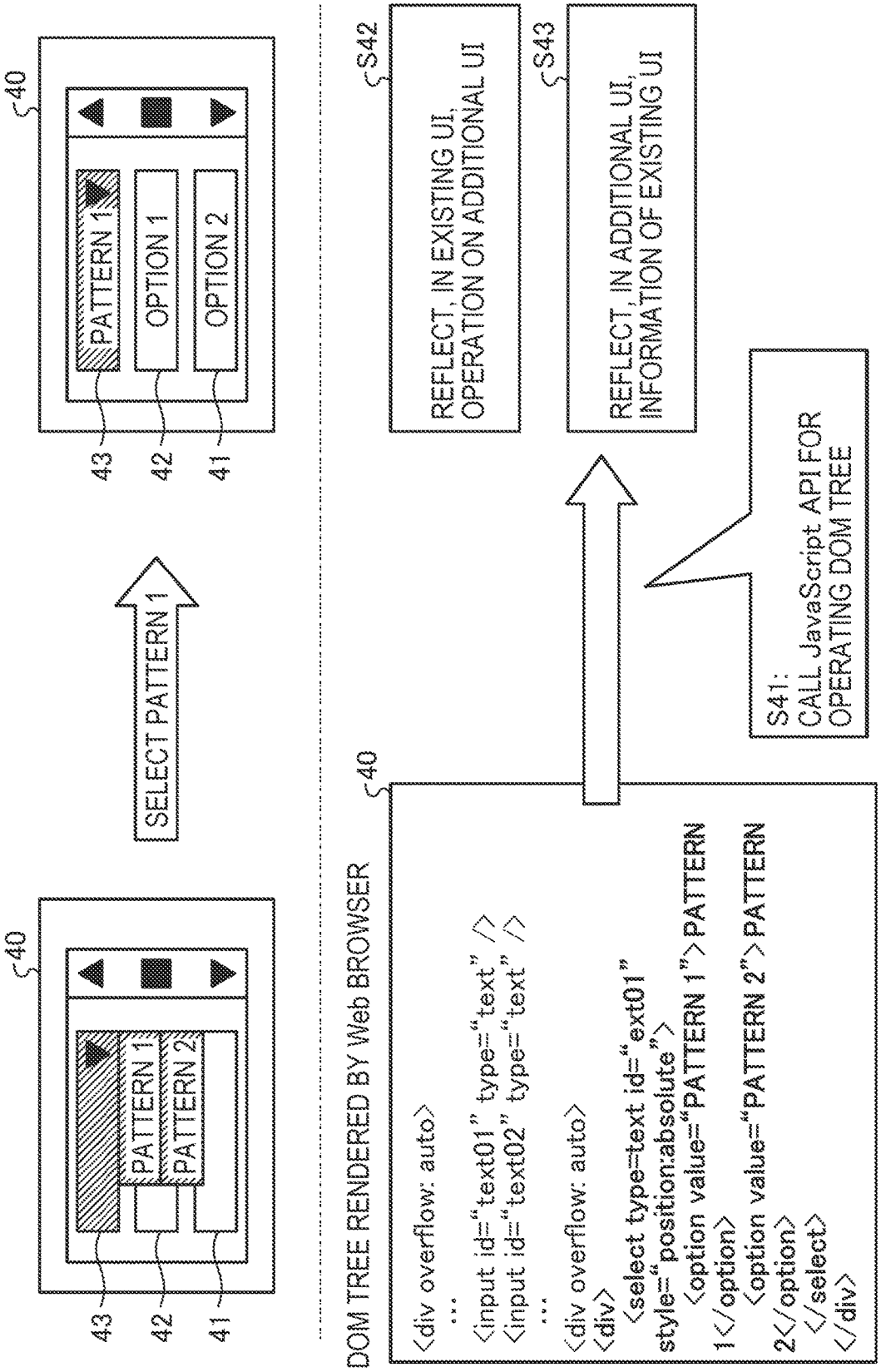

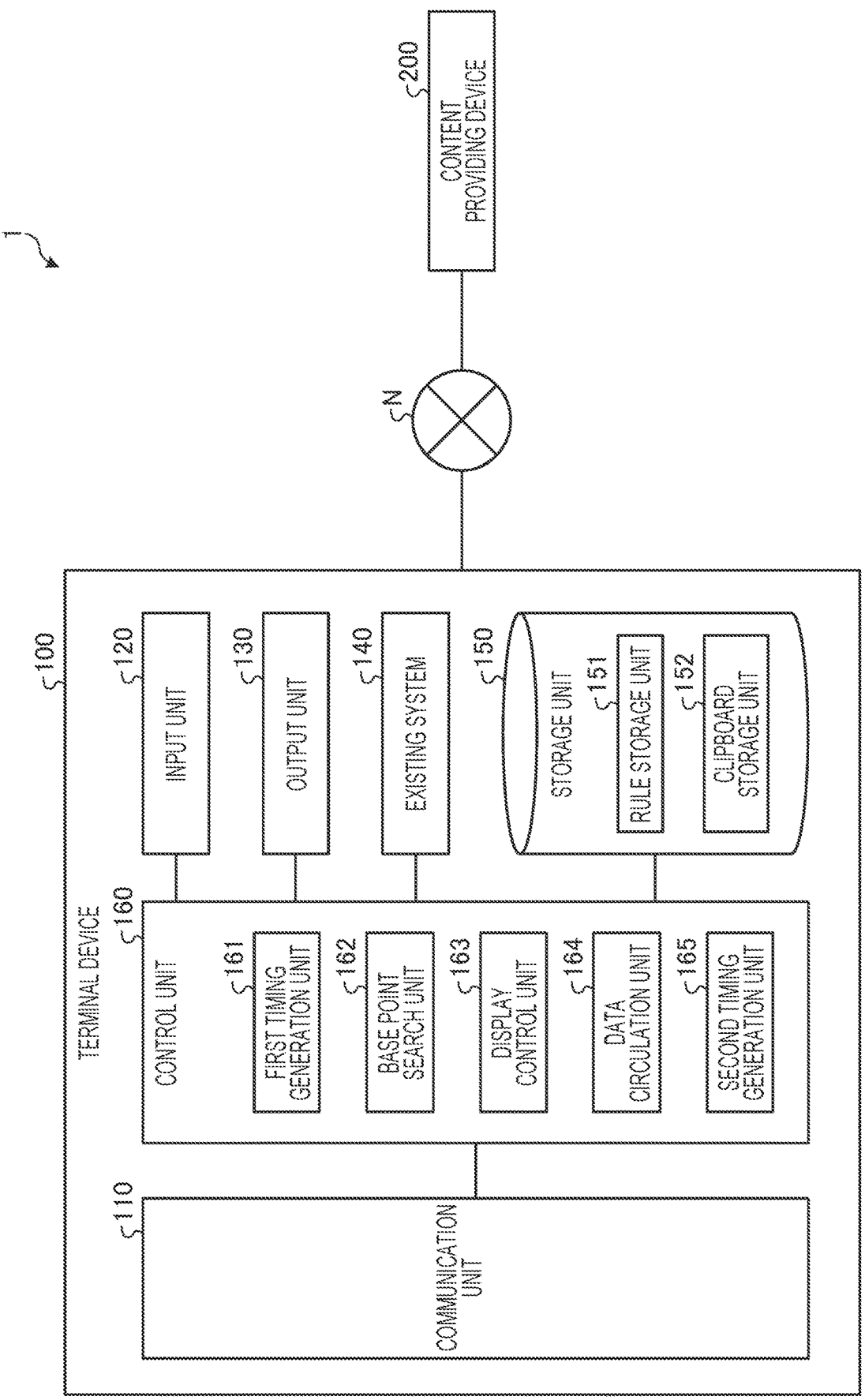

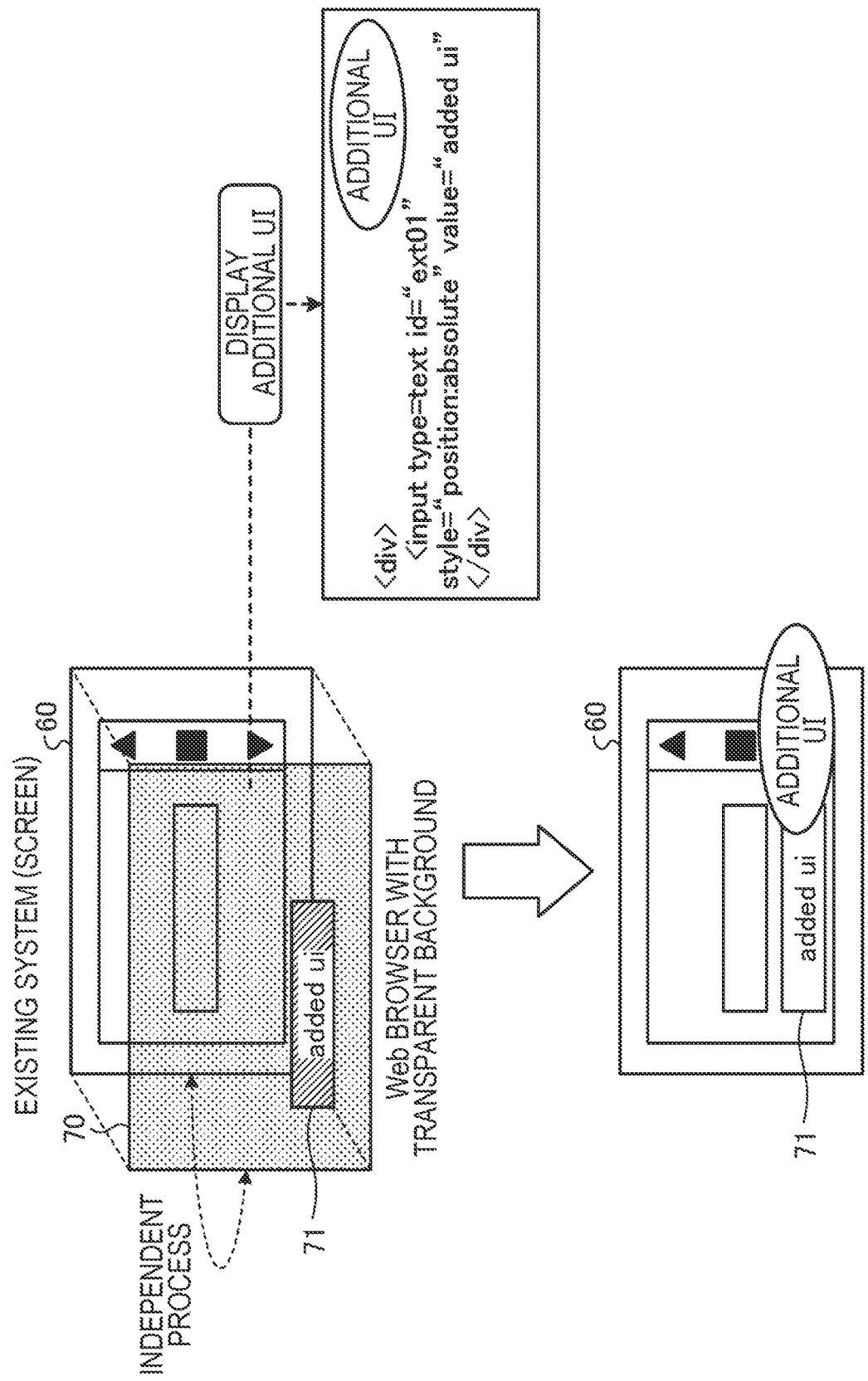

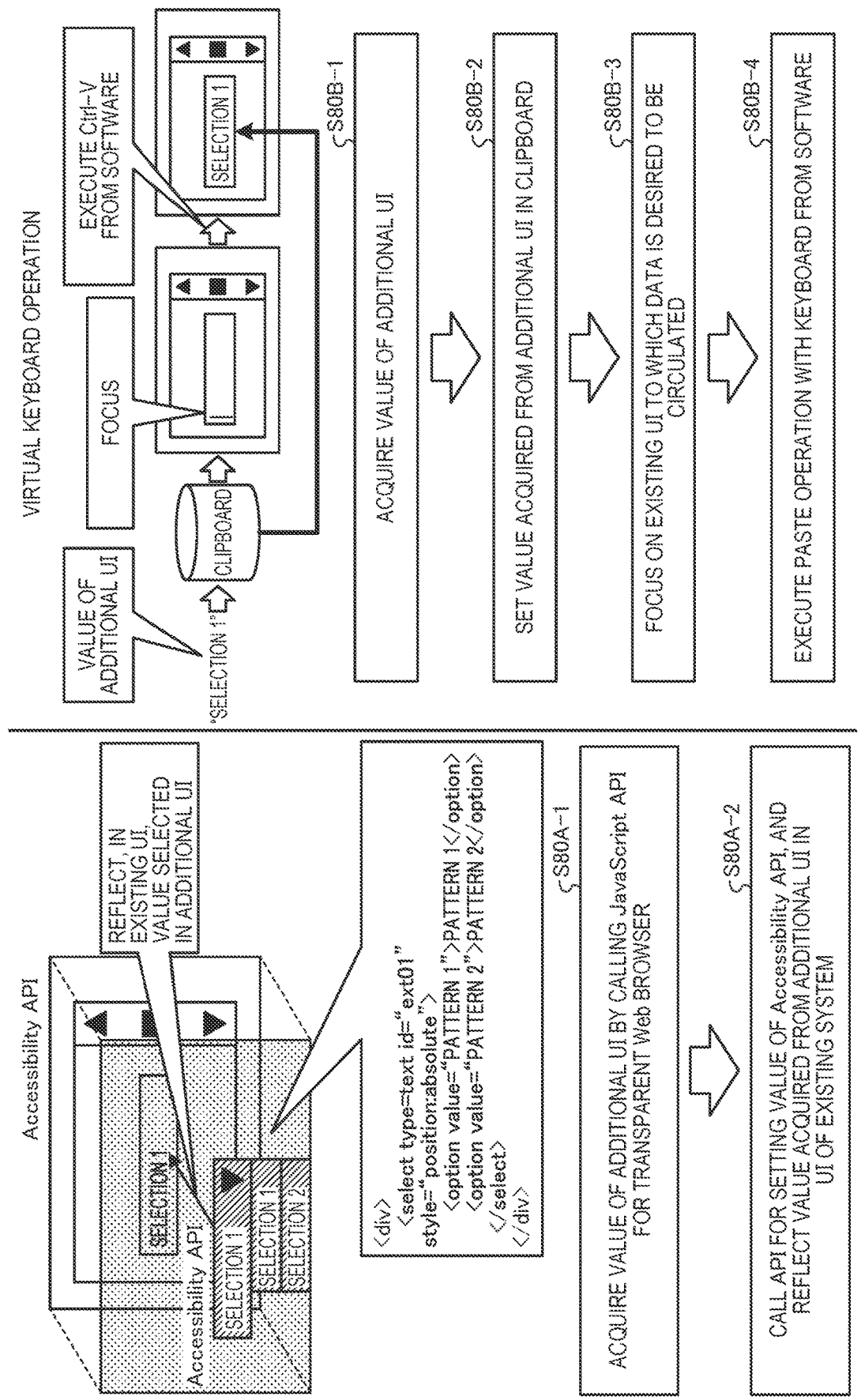

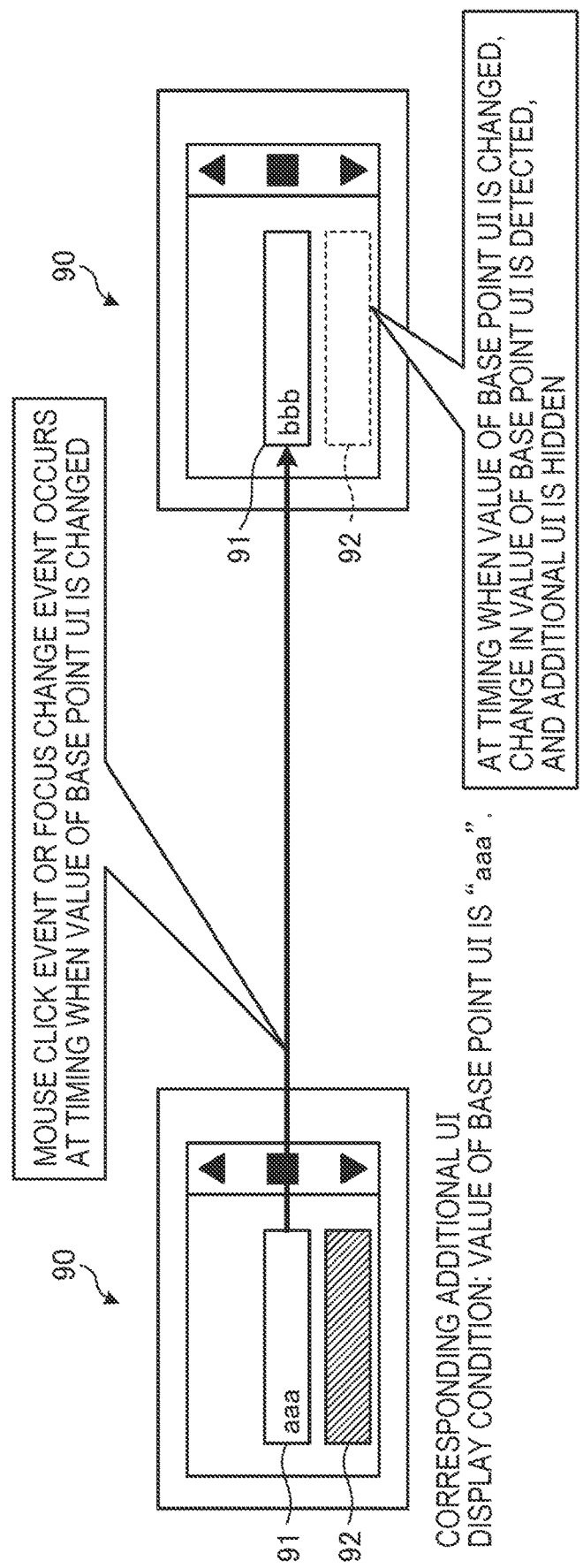

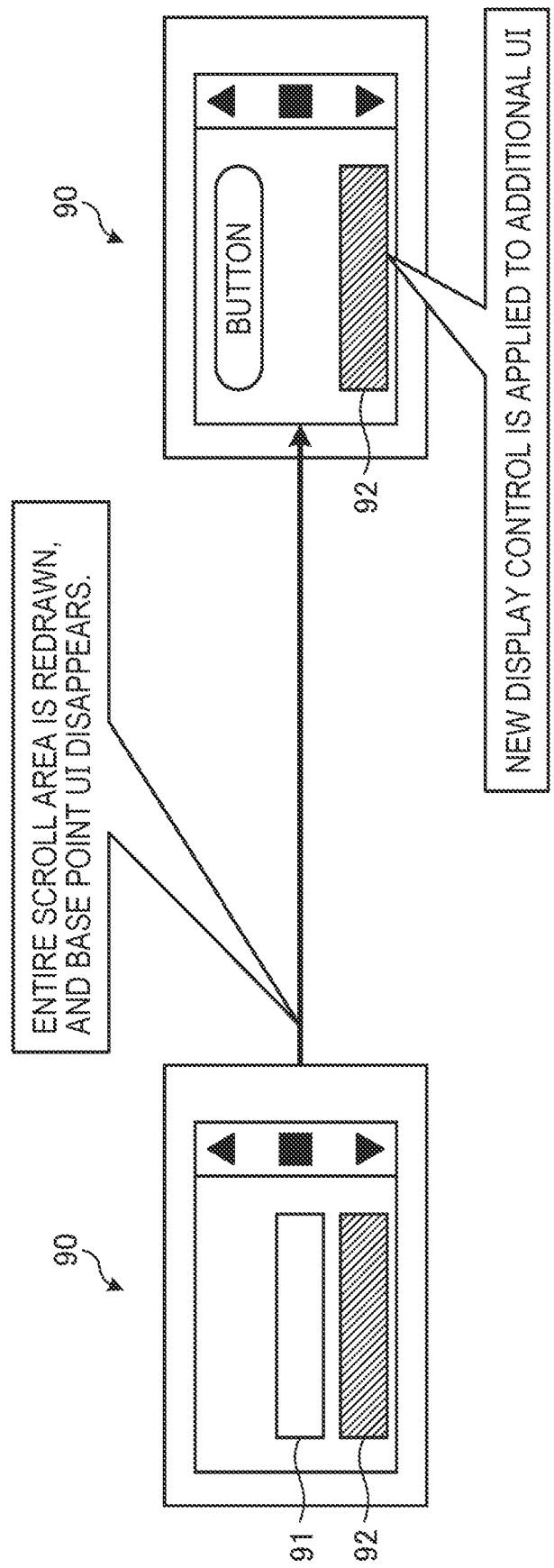

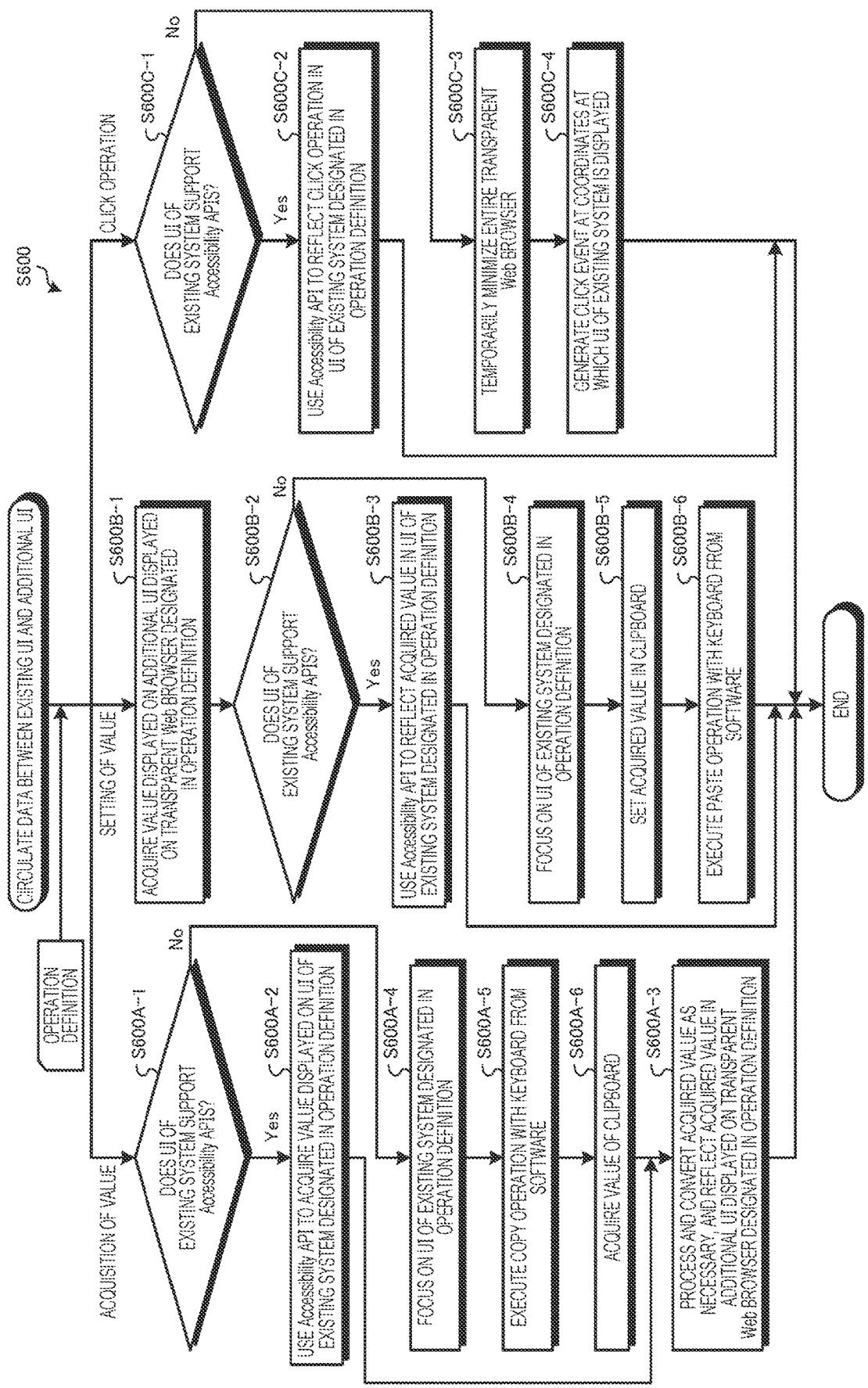

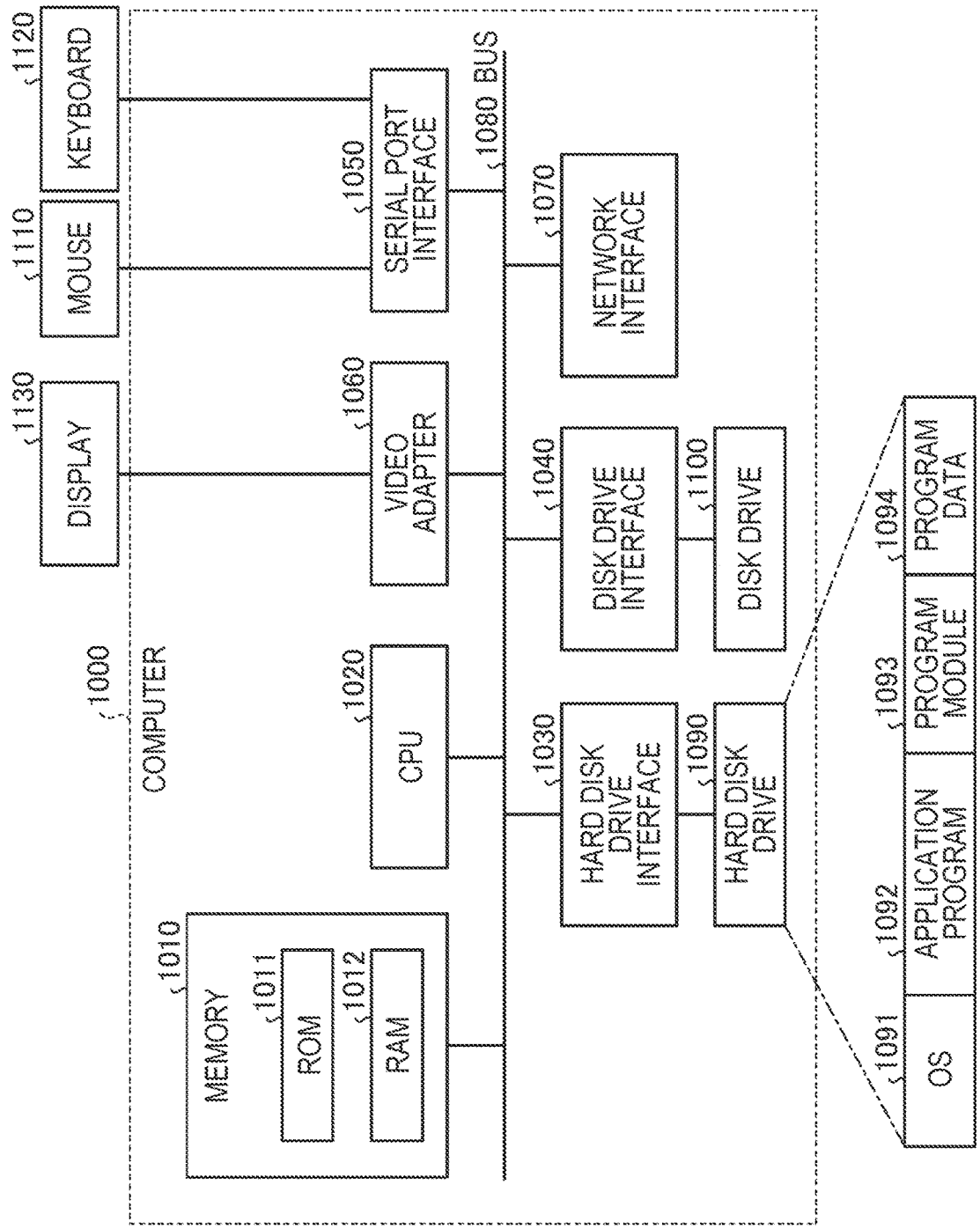

USER INTERFACE AUGMENTATION SYSTEM, USER INTERFACE AUGMENTATION METHOD, AND USER INTERFACE AUGMENTATION PROGRAM

CROSS-REFERENCE TO RELATED APPLICATIONS

This application is a National Stage application under 35 U.S.C. § 371 of International Application No. PCT/JP2020/044397, having an International Filing Date of Nov. 27, 2020, the disclosure of which is considered part of the disclosure of this application, and is incorporated by reference in its entirety into this application.

TECHNICAL FIELD

The present disclosure relates to a user interface augmentation system, a user interface augmentation method, and a user interface augmentation program.

BACKGROUND ART

User interface (UI) augmentation techniques have conventionally been proposed. UI augmentation techniques are used to display an additional UI on a screen of an existing system to improve system operation.

Conventional UI augmentations are used for web systems. For example, a conventional UI augmentation uses a method such as a proxy server, a browser add-on, or interprocess communication for a Hypertext Transfer Protocol (HTTP) response of a web system or a document object model (DOM) drawn by a web browser. Thus, the conventional UI augmentation allows for display of an additional UI by inserting Hyper Text Markup Language (HTML) or JavaScript (registered trademark) into the web system.

CITATION LIST

Patent Literature

Patent Literature 1: JP 2018-5344 A

SUMMARY OF INVENTION

Technical Problem

However, with conventional UI augmentations, it is difficult to apply a user interface augmentation to a wide range of systems. For example, due to architectural constraints, conventional UI augmentations may not be applicable to screens other than screens of web systems.

The present application has been made in view of the above, and is aimed at applying a user interface augmentation to a wide range of systems.

Solution to Problem

A user interface augmentation system according to an embodiment of the present disclosure includes: a memory and a processor coupled to the memory. The processor is configured to perform operations including: searching a system screen for a base point UI serving as a base point for display of an additional user interface (UI) to be added to the system screen; displaying a new screen with a transparent background in such a way as to overlap the system screen, and; displaying the additional UI at a position based on the base point UI on the new screen.

Advantageous Effects of Invention

According to an aspect of the embodiment, a user interface augmentation can be applied to a wide range of systems.

BRIEF DESCRIPTION OF DRAWINGS

FIG. 2 is an explanatory diagram illustrating an example of a UI augmentation according to an implementation example.

FIG. 3A is an explanatory diagram illustrating an example of display control for an additional UI.

FIG. 3B is an explanatory diagram illustrating an example of display control for an additional UI.

FIG. 3C is an explanatory diagram illustrating an example of display control for an additional UI.

FIG. 4 is a diagram illustrating an example of a user interface augmentation system according to an embodiment.

FIG. 7 is an explanatory diagram illustrating an example of display control processing for controlling display of an additional UI.

FIG. 8 is an explanatory diagram illustrating an example of data circulation processing for circulating data between an existing UI and an additional UI.

FIG. 9A is an explanatory diagram illustrating an example of timing generation processing for generating a timing to redisplay an additional UI.

FIG. 9B is an explanatory diagram illustrating an example of timing generation processing for generating a timing to redisplay an additional UI.

FIG. 15 is a flowchart illustrating an example of processing for circulating data between an existing UI and an additional UI, executed by the terminal device according to the embodiment.

FIG. 16 is a diagram illustrating an example of a hardware configuration.

DESCRIPTION OF EMBODIMENTS

Figure 1:
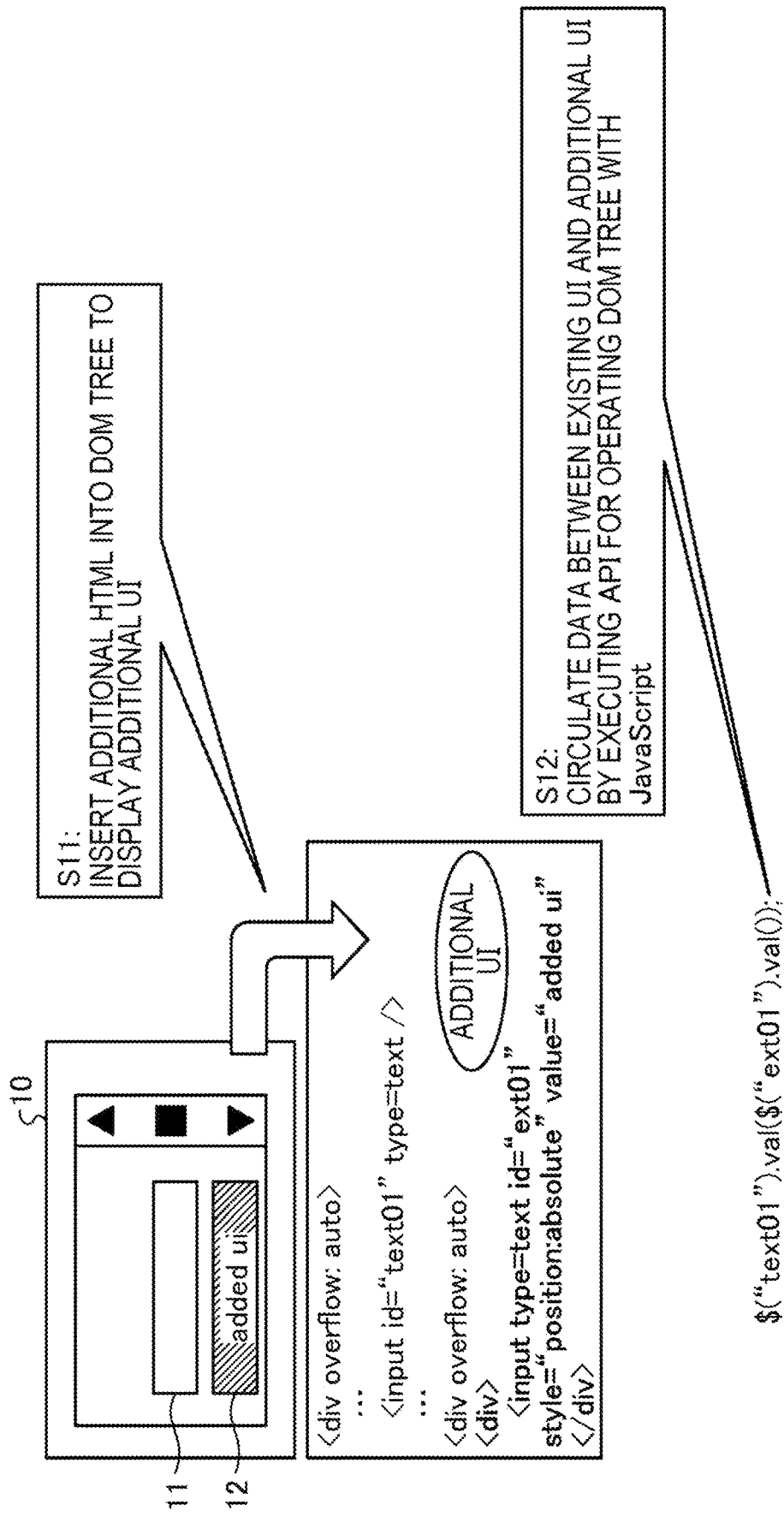
FIG. 1 is an explanatory diagram illustrating an example of a conventional UI augmentation.

An embodiment of the present disclosure will be described below in detail with reference to the drawings.

Note that the present invention is not limited by this embodiment. Details of one or more embodiments are set forth in the following description and drawings. Note that a plurality of the embodiments can be appropriately combined without causing contradiction in processing contents. In the following one or more embodiments, the same portions are denoted by the same reference numerals, and redundant description will be omitted.

1. Outline

This section describes an outline of some forms of implementation described in the present specification. Note that this outline is provided for the convenience of a reader and is not intended to limit the present invention or the embodiment described in the following sections.

UI augmentations used for web systems have conventionally been proposed. The conventional UI augmentation allows an additional UI to be displayed by inserting HTML into a DOM tree drawn by a web browser. In the conventional UI augmentation, both an existing UI and an additional UI are present in a DOM tree on the same web browser.

In the conventional UI augmentation, it is possible to circulate data between the existing UI and the additional UI by executing JavaScript for operating a DOM on the web browser. Circulation of data includes, for example, reflecting, in the existing UI, a value input to the additional UI. However, with the mechanism as described above, it is difficult to apply the conventional UI augmentation to systems other than web systems.

FIG. 1 is an explanatory diagram illustrating an example of the conventional UI augmentation. In the example in FIG. 1, a screen 10 is a screen of a web system (e.g., a screen of an existing business system). The screen 10 includes an existing UI 11.

First, the conventional UI augmentation allows an additional UI 12 to be displayed by inserting additional HTML into the DOM tree of the screen 10 of the web system. In the example in FIG. 1, the existing UI 11 and the additional UI 12 are present in the same web browser.

Then, the conventional UI augmentation circulates data between the existing UI 11 and the additional UI 12 by executing an API for operating a DOM tree with JavaScript (step S12). The existing UI 11 and the additional UI 12 are present in the same web browser. Thus, the conventional UI augmentation allows for circulation of data relatively easily by operating the DOM tree with a program (JavaScript) running on the web browser. However, in the conventional UI augmentation, the DOM tree is operated, which makes it difficult to apply the conventional UI augmentation to systems other than web systems.

Therefore, a user interface augmentation system according to the embodiment provides a UI augmentation that can be applied regardless of implementation of the system. The user interface augmentation system allows a web browser with a transparent background having the same size as a screen of an existing system to operate independently of the screen on top of this screen, and displays an additional UI on the web browser. Furthermore, the user interface augmentation system circulates data between an existing UI that is completely independent of an additional UI and the additional UI, with a combination of an accessibility API and keyboard emulation using image processing.

FIG. 2 is an explanatory diagram illustrating an example of a UI augmentation according to an implementation example. In the example in FIG. 2, the screen 10 may be a screen of a system other than web systems, or may be a screen of a web system.

In the UI augmentation according to the implementation example, the user interface augmentation system displays an additional UI on an independent web browser 20 with a transparent background (step S21). The web browser 20 is completely independent of the screen 10. That is, the process of the web browser 20 is different from the process of the screen 10.

To support systems of various implementations other than web browsers, the user interface augmentation system combines an accessibility API and a virtual keyboard operation, and circulates data between the existing UI and the additional UI (step S22).

In a case where the UI of the existing system can use the accessibility API, the user interface augmentation system operates the existing system with the accessibility API to reflect contents of the additional UI in the existing UI.

In a case where the UI of the existing system cannot use the accessibility API, the user interface augmentation system virtually executes a copy and paste operation with a keyboard. Specifically, the user interface augmentation system copies the contents of the additional UI and pastes the contents into the existing UI, thereby reflecting the contents of the additional UI in the existing UI.

Thus, the user interface augmentation system can dramatically improve the operability of the business system without modifying the existing business system, thereby improving business efficiency. Furthermore, the user interface augmentation system allows the UI augmentation to be applied to a wide range of systems and services other than web systems.

2. Introduction

Today, various systems are used for business. The actual state of business changes every day, and it is important to update a business system in accordance with the actual state of the business. For example, it is assumed that a new menu is added to a service. In this example, if the business system does not support the new menu, a user of the business system cannot perform business related to the new menu on the business system.

Therefore, UI augmentation technique has been proposed so that business systems are updated in a timely manner. UI augmentation technique for extending UIs of a business system is discussed in detail in Patent Literature 1 described above, for example. In the UI augmentation technique, display of a UI added to a screen of a business system is controlled.

FIGS. 3A, 3B, and 3C are explanatory diagrams illustrating examples of display control for an additional UI. In FIGS. 3A, 3B, and 3C, an additional UI is displayed on a screen of an existing system, such as a screen of a business system. Furthermore, a base point UI serving as a base point for display is designated for the additional UI. A base point UI is a UI existing on the screen of the existing web system. In a case where this base point UI is displayed on the screen, the additional UI is displayed on the screen on the basis of the relative coordinates from the base point UI. Hereinafter, a "UI to be a base point" may be referred to as a "base point UI".

In a conventional UI augmentation, an additional UI is inserted at the end of a DOM tree constituting a screen of an existing system. In the conventional UI augmentation, an additional UI can be displayed without influence of directly modifying a screen of the existing web system being caused.

In the example in FIG. 3A, a screen 30 of the existing system includes an existing UI 31 and a base point UI 32. The base point UI 32 is a UI serving as a base point for display of an additional UI 31 displayed on the screen 30 of the existing system. An arrow illustrated in FIG. 3A illustrates a correspondence between the DOM tree of the screen and the appearance of the screen. In the conventional UI augmentation, an additional UI is displayed by inserting HTML of the additional UI at the end of a DOM tree rendered by a web browser.

In the example in FIG. 3A, the additional UI 33 (text box) is displayed with the conventional UI augmentation. In the conventional UI augmentation, the HTML of the additional UI 33 is inserted into the DOM of the screen 30 of the existing system. However, systems other than web systems do not have a DOM tree in the first place. For this reason, in a case where the UI augmentation is used for a system other than web systems, the conventional UI augmentation cannot display an additional UI on the system screen by the method of inserting the HTML of the additional UI into the DOM tree.

In the example in FIG. 3B, as in the case of FIG. 3A, the screen 30 of the existing system includes the existing UI 31 and the base point UI 32. In addition, the additional UI 33 is displayed on the screen 30 of the existing system.

In the conventional UI augmentation, whether to display an additional UI is determined by designating a base point UI from among UIs displayed on the existing system screen. Then, when the base point UI is displayed, the conventional UI augmentation performs control to display the corresponding additional UI.

In the example in FIG. 3B, the base point UI 32 is a base point UI corresponding to the additional UI 31. When the base point UI 32 is displayed, the additional UI 33 is also displayed. When the base point UI 32 is not displayed, the additional UI 33 is also not displayed.

As described above, conventional UI augmentations are used for web systems. A conventional UI augmentation calls a JavaScript API for operating a DOM tree (step S31). Thus, the conventional UI augmentation confirms whether there is a base point UI (step S32). For example, the conventional UI augmentation can easily confirm whether there is a base point UI by checking a result of executing "document-.getElementById ("text01")" on the basis of id information.

However, as described above, systems other than web systems do not have a DOM tree in the first place. For this reason, in a case where the UI augmentation is used for a system other than web systems, the conventional UI augmentation cannot confirm whether there is a base point UI by using an API for operating a DOM tree.

In the example in FIG. 3C, a screen 40 of an existing system includes an existing U 41, an existing U 42, and an additional UI 43. The conventional UI augmentation circulates data between a UI displayed in an existing system and an additional UI. For example, in a case where a value of an added UI (pull-down) has been selected, the conventional UI augmentation reflects information corresponding to the selected value in a UI (text box) of the existing system. Thus, the conventional UI augmentation improves UI efficiency such as simplification of input.

In a conventional UI augmentation, both an additional UI and an existing UI are present in the same DOM tree rendered by a web browser. Thus, the conventional UI augmentation calls a JavaScript API for operating a DOM tree so that the following two pieces of processing in data circulation can be easily implemented (step S41).

The first processing is to reflect, in the existing UI on the system screen, an operation on the additional UI (step S42). The second processing is to reflect, in the additional UI, information of the existing UI on the system screen (step S43).

For example, in a case where the conventional UI augmentation sets a value for the existing UI in accordance with selection of the additional UI, the conventional UI augmentation executes JavaScript as described below. The JavaScript to be executed is, for example, "if ($("#ext01").val( )=="pattern 1"){$("text01").val("option 1");$("text02").val("option 2");}".

However, as described above, systems other than web systems do not have a DOM tree in the first place. For this reason, in a case where the UI augmentation is used for a system other than web systems, the conventional UI augmentation cannot circulate data by using an API for operating a DOM tree.

As described above, the conventional UI augmentation inserts an additional UI at the end of a DOM tree. Thus, in the conventional UI augmentation, it is difficult to display an additional UI on a system screen having a GUI other than web systems.

In order to implement a UI augmentation that can be applied to a system other than web systems, it is conceivable that the following three pieces of processing are required for a system having various GUI implementations. The first processing is display processing for displaying the additional UI on the system screen. The second processing is specifying processing for specifying a UI serving as a base point. The third processing is circulation processing for circulating data between the existing UI and the additional UI. Specifically, the third processing includes processing for reflecting, in the existing UI on the system screen, an operation on the additional UI, and processing for reflecting, in the additional UI, information of the existing UI on the system screen.

Thus, in order to apply the UI augmentation to a system other than web systems, the user interface augmentation system according to the embodiment executes processing described below.

The user interface augmentation system according to the embodiment displays an additional UI on the system screen. The user interface augmentation system operates a web browser with a transparent background on top of a system screen independently of the system screen, and displays an additional UI on the transparent web browser.

In addition, the user interface augmentation system specifies a UI serving as a base point. For example, the user interface augmentation system specifies a UI serving as a base point by the following two methods, depending on implementation of the system. The first method is specification of a UI by an accessibility API using a property value of the UI serving as a base point. The second method is specification of a UI by image processing, such as pattern matching using a captured image of the UI serving as a base point.

Furthermore, the user interface augmentation system circulates data between an existing UI and an additional UI. For example, the user interface augmentation system circulates data by using the following two ways, depending on the implementation of the system. In the first method, the user interface augmentation system circulates data by using an accessibility API to acquire and change a property of the existing UI. In the second method, the user interface augmentation system circulates data via a clipboard by a copy-and-paste operation with the keyboard.

This allows the user interface augmentation system to apply the UI augmentation to a system other than web systems. The user interface augmentation system can display an additional UI on a system screen having a GUI of a system other than web systems. In addition, the user interface augmentation system can circulate data between an existing UI and an additional UI.

3. Configuration of User Interface Augmentation System

Next, a configuration example of the user interface augmentation system according to the embodiment will be described with reference to FIG. 4.

FIG. 4 is a diagram illustrating an example of a user interface augmentation system 1 according to the embodiment. As illustrated in FIG. 4, the user interface augmentation system 1 includes a terminal device 100 and a content providing device 200. Although not illustrated in FIG. 4, the user interface augmentation system 1 may include a plurality of the terminal devices 100 and a plurality of the content providing devices 200.

In the user interface augmentation system 1, each of the terminal device 100 and the content providing device 200 is connected to a network N in a wired or wireless manner. The network N is, for example, the Internet, a wide area network (WAN), or a local area network (LAN). The components of the user interface augmentation system 1 can communicate with each other via the network N.

[3-1. Components]

The terminal device 100 is an information processing device that executes processing for extending a user interface. The terminal device 100 may be any type of information processing device including a client device. A configuration example of the terminal device 100 will be described in detail in the following section.

The content providing device 200 is an information processing device used by a content provider. The content provider provides content to the terminal device 100. The term "content" can include various types of information related to a screen, such as a screen of an application (that is, a window) and contents of a web page. The content providing device 200 may be any type of information processing device, including a server.

[3-2. Configuration of Terminal Device]

Next, a configuration example of the terminal device 100 will be described.

As illustrated in FIG. 4, the terminal device 100 includes a communication unit 110, an input unit 120, an output unit 130, an existing system 140, a storage unit 150, and a control unit 160.

(Communication Unit 110)

The communication unit 110 is constituted by, for example, a network interface card (NIC). The communication unit 110 is connected to a network in a wired or wireless manner. The communication unit 110 is communicably connected to the content providing device 200 via the network N. The communication unit 110 can transmit and receive information to and from the content providing device 200 via the network.

(Input Unit 120)

The input unit 120 is an input device that receives various operations from a user of the terminal device 100. For example, the input unit 120 is implemented using a keyboard, a mouse, an operation key, or the like.

(Output Unit 130)

The output unit 130 is a display device for displaying various types of information. For example, the output unit 130 is implemented using a liquid crystal display, an organic electro luminescence (EL) display, or the like. Note that, in a case where a touch panel is adopted for the terminal device 100, the input unit 120 and the output unit 130 are integrated.

(Existing System 140)

The existing system 140 is existing software such as a business system and various applications. The existing system 140 receives content from the content providing device 200. In addition, the existing system 140 has a UI. The received content is provided to a user of the terminal device 100 via the UI.

In the example in FIG. 4, the existing system 140 is illustrated as software installed on the terminal device 100, but the present invention is not limited thereto. The existing system 140 may be installed on the content providing device 200. However, it is assumed that the UI of the existing system 140 is present in the terminal device 100.

(Storage Unit 150)

The storage unit 150 is implemented using, for example, a semiconductor memory element such as a random access memory (RAM) or a flash memory, or a storage device such as a hard disk or an optical disk. As illustrated in FIG. 4, the storage unit 150 includes a rule storage unit 151 and a clipboard storage unit 152.

(Rule Storage Unit 151)

The rule storage unit 151 stores a rule related to a system definition. The rule includes at least one system definition.

Figure 5:
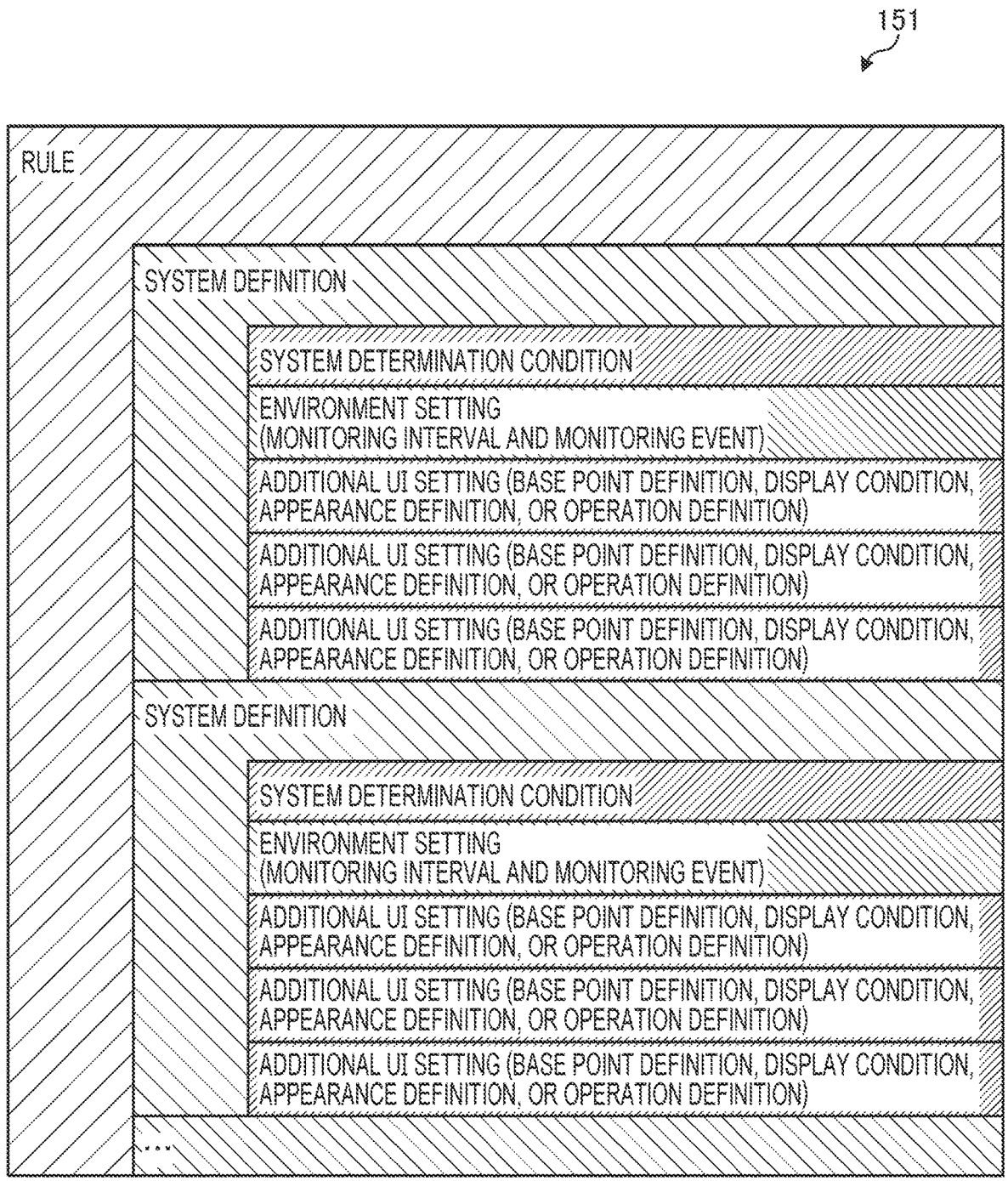
FIG. 5 is a diagram illustrating an example of a rule storage unit according to the embodiment.

FIG. 5 is a diagram illustrating an example of the rule storage unit 151 according to the embodiment. As illustrated in FIG. 5, the rule storage unit 151 stores a rule including a plurality of system definitions. Each system definition includes a system determination condition, an environment setting (monitoring interval and monitoring event), and at least one additional UI setting (base point definition, display condition, appearance definition, or operation definition).

The system determination condition includes, for example, a process name (e.g., myapplication.exe) and a window title name (e.g., My Application).

The environment setting includes at least one of a monitoring interval indicating timings of monitoring changes in an existing system or a monitoring event indicating a list of events used as changes in the existing system. For example, the environment setting includes, for example, a monitoring interval (e.g., 5 seconds) or a monitoring event (e.g., a mouse wheel event or a window size change event).

The additional UI setting includes a base point definition, a display condition, an appearance definition, or an operation definition. For example, the additional UI setting includes at least one of 1) a base point definition including a captured image or a property value that is information regarding an UI of the existing system serving as a base point when a UI to be added is displayed, 2) a display condition indicating a condition under which the UI to be added is displayed, 3) an appearance definition indicating an appearance of the UI to be added, or 4) an operation definition indicating a behavior of the UI to be added.

(Clipboard Storage Unit 152)

The clipboard storage unit 152 stores a clipboard. The clipboard is used by a data circulation unit 164 described later.

(Control Unit 160)

The control unit 160 is a controller, and is implemented using, for example, a processor such as a central processing unit (CPU) or a micro processing unit (MPU) performing various programs (corresponding to an example of a user interface augmentation program) stored in a storage device inside the terminal device 100 using a RAM or the like as a work area. Alternatively, the control unit 160 may be constituted by, for example, an integrated circuit such as an application specific integrated circuit (ASIC), a field programmable gate array (FPGA), or a general purpose graphic processing unit (GPGPU).

As illustrated in FIG. 4, the control unit 160 includes a first timing generation unit 161, a base point search unit 162, a display control unit 163, the data circulation unit 164, and a second timing generation unit 165, and implements or executes a function or an action of information processing described below. One or more processors of the terminal device 100 can implement a function of each control unit in the control unit 160 by executing an instruction stored in one or more memories of the terminal device 100. Note that the internal configuration of the control unit 160 is not limited to the configuration illustrated in FIG. 4, and may be another configuration as long as information processing described later is performed. For example, the display control unit 163 may perform all or part of information processing described later in relation to a unit other than the display control unit 163.

As an example, the control unit 160 is implemented as a first application installed on the terminal device 100. In this example, the existing system 140 described above is implemented as a second application installed on the terminal device 100.

(First Timing Generation Unit 161)

The first timing generation unit 161 determines a timing to search the system screen for a base point UI. For example, the first timing generation unit 161 monitors the existing system 140. Then, the first timing generation unit 161 determines the timing to search the screen of the existing system 140 for a base point UI on the basis of whether the screen of the existing system 140 is displayed so as to be visible. In this manner, the first timing generation unit 161 adjusts the timing to search for a base point UI. The first timing generation unit 161 can monitor the existing system 140 with the use of a method such as UI Automation or global hook.

As an example, the first timing generation unit 161 acquires system determination conditions and environment settings from all the system definitions of the rule stored in the rule storage unit 151. After each elapse of the time of the monitoring interval included in the environment settings, the first timing generation unit 161 determines whether a system window that matches the system determination conditions is displayed in the foreground on the desktop. In a case where the window is displayed in the foreground, the base point search unit 162 is called by using all the additional UI settings included in the system definitions as inputs.

(Base Point Search Unit 162)

The base point search unit 162 searches the system screen for a base point UI serving as a base point for display of an additional UI to be added to the system screen. For example, the base point search unit 162 uses, as inputs, the additional UI settings saved in the rule stored in the rule storage unit 151. Then, the base point search unit 162 searches the screen of the existing system 140 for a UI (base point UI) that matches the base point definition at a timing as instructed by the first timing generation unit 161.

As an example, the base point search unit 162 is called at the timing as instructed by the first timing generation unit 161. In a case where a property value has been set as a base point definition, the base point search unit 162 uses an accessibility API to search for a UI (base point UI) that matches the property value as the base point definition. In a case where a captured image is set as a base point definition, the base point search unit 162 uses, as inputs, the captured image as the base point definition and a captured image indicating the current display of the screen of the existing system. Then, the base point search unit 162 searches for a UI (base point UI) that matches the captured image as the base point definition by an optional image processing method such as template matching.

In a case where a base point UI is found and a display condition has been set as a base point definition, the base point search unit 162 acquires a value from the base point UI by information processing (acquisition of a value) described later in relation to the data circulation unit 164. Then, the base point search unit 162 determines whether a value of the base point UI matches the display condition.

The base point search unit 162 returns "match" or "mismatch" as a determination result. In a case where "match" is returned as a determination result, the base point search unit 162 returns the coordinates and the size of the base point UI together with the determination result. In addition, the base point search unit 162 adds the base point UI as a monitoring target for the second timing generation unit 165. In a case where no base point UI has been found, the base point search unit 162 returns "mismatch" as a determination result.

In this manner, the base point search unit 162 specifies a base point UI, which is a display target of an additional UI, on the basis of a property value of a UI used in an accessibility API or a result of image processing for a captured image of the system screen.

Figure 6:
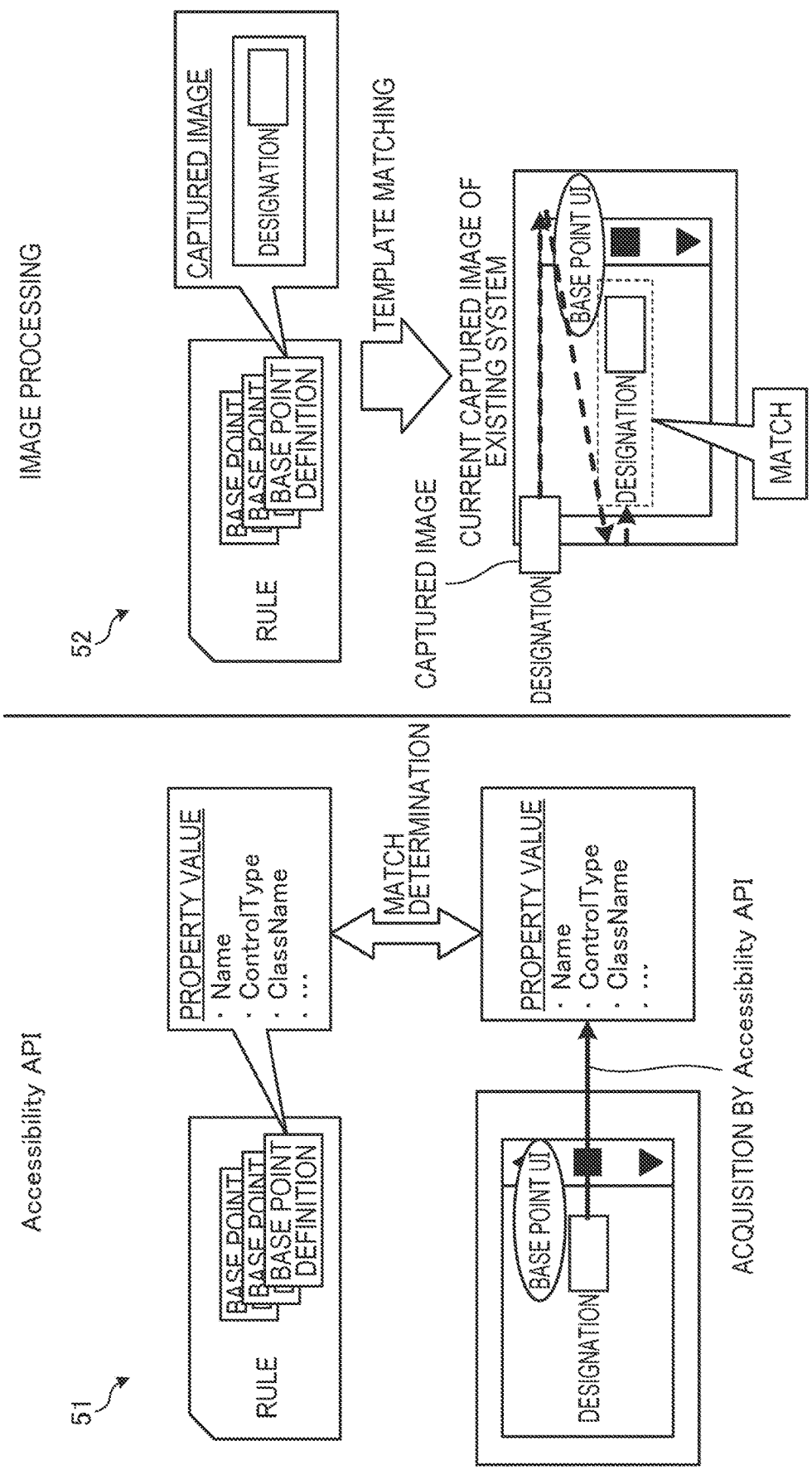
FIG. 6 is an explanatory diagram illustrating an example of base point search processing for searching for a base point UI serving as a base point for display of an additional UI.

FIG. 6 is an explanatory diagram illustrating an example of base point search processing for searching for a base point UI serving as a base point for display of an additional UI. The base point search unit 162 specifies a UI serving as a base point from an existing system (e.g., existing system 140).

In a case where the UI augmentation is used for a web system, the UI serving as a base point can be easily specified with the use of a JavaScript API for operating a DOM. However, in a case where the UI augmentation is used for an optional system, the UI augmentation cannot use a uniform mechanism such as a JavaScript API.

Thus, in order to support implementation of various systems, the base point search unit 162 specifies a UI serving as a base point by using an accessibly API and image processing in combination. The rule stored in the rule storage unit 151 described above holds a base point definition for specifying a base point. The base point search unit 162 can set, as the base point definition, either a property value for specifying the base point UI by the accessibility API or a captured image for specifying the base point UI by image processing.

In the example in FIG. 6, processing 51 is processing for specifying a base point UI with an accessibility API. The base point search unit 162 can use the accessibility API depending on the implementation of the system. For example, in a case of implementation of Windows Presentation Foundation (WPF) or the like of Windows (registered trademark), the base point search unit 162 can use UI Automation or the like. Furthermore, in a case of implementation of Java (registered trademark) Swing or the like, the base point search unit 162 can use Java Access Bridge or the like. In a case where the base point search unit 162 can use the accessibility API, the base point search unit 162 can acquire a property value of each UI constituting the system screen.

The base point search unit 162 can set a property value as a base point definition of the rule stored in the rule storage unit 151. In this case, the base point search unit 162 can sequentially acquire the property value of the UI of the target existing system by the accessibility API. The base point search unit 162 can specify a UI serving as a base point by determining whether there is an acquired property value that matches the property value as the base point definition.

In the example in FIG. 6, processing 52 is processing for specifying a base point UI by image processing. In a case where the UI of the system is constructed by unique implementation, the base point search unit 162 may not be able to use the accessibility API. Even in such a case, the base point search unit 162 can set a captured image as a base point definition. The base point search unit 162 can specify a UI serving as a base point by comparing the current captured image of the system screen and the captured image set as the base point definition by image processing such as template matching.

(Display Control Unit 163)

The display control unit 163 displays a new screen with a transparent background in such a way as to overlap the system screen. Then, the display control unit 163 displays an additional UI at a position based on a base point UI on the new screen.

For example, the display control unit 163 uses, as inputs, the additional UI settings saved in the rule stored in the rule storage unit 151 and results of search by the base point search unit 162. Then, the display control unit 163 displays, on top of the screen of the existing system 140, a web browser with a transparent background having a window size that matches the window size of the screen of the existing system 140. Furthermore, the display control unit 163 displays an additional UI on the web browser in accordance with the appearance definition.

As an example, the display control unit 163 uses, as inputs, a determination result output by the base point search unit 162, the coordinates of the base point UI, and the size of the base point UI. In a case where the determination result is "match", the display control unit 163 calculates a display position of the additional UI from the coordinates of the base point UI and the relative coordinates set as the appearance definition.

In a case where the corresponding additional UI is not displayed on the transparent web browser, the display control unit 163 newly displays the additional UI at the calculated display position in accordance with HTML information set as the appearance definition. In a case where the corresponding additional UI has already been displayed, the display control unit 163 changes the current display position of the additional UI to the calculated display position.

In a case where the determination result is "mismatch" and the corresponding additional UI has already been displayed on the transparent web browser, the display control unit 163 hides the corresponding additional UI.

For an event of an operation on a transparent area in the transparent web browser, the transparent web browser may circulate all operational events that have occurred in areas where no additional UI is displayed to the existing system displayed behind the transparent web browser. For example, for all events of operations on areas where no additional UI is displayed, the transparent web browser may circulate all the operational events to the existing system without any processing.

In this manner, the display control unit 163 operates a web browser with a transparent background that is independent of the system screen to display an additional UI on the web browser.

FIG. 7 is an explanatory diagram illustrating an example of display control processing for controlling display of an additional UI. In the example in FIG. 7, the display control unit 163 displays an additional UI on a system screen 60. The system screen 60 is a screen of an existing system.

The display control unit 163 operates a web browser 70 with a transparent background on top of the web browser 70 independently of the system screen 60, and displays a UI 71 on the transparent web browser 70. Note that the system screen 60 may be implemented by WPF of Windows, Swing of Java, or the like. When a user of the terminal device 100 views the system screen 60 from the front, the UI 71 looks as if the UI 71 has been added to the original system screen 60, in a similar manner to a conventional UI augmentation.

(Data Circulation Unit 164)

The data circulation unit 164 circulates data between an existing UI on the system screen and an additional UI. For example, the data circulation unit 164 uses, as inputs, the additional UI settings saved in the rule stored in the rule storage unit 151. Then, in accordance with an operation definition, between the additional UI displayed on a transparent web browser by the display control unit 163 and the UI displayed on the existing system 140, the data circulation unit 164 circulates, to both of the UIs, data input to or displayed on each UI.

As an example, the data circulation unit 164 provides data circulation corresponding to at least one of operation definitions including value acquisition, value setting, and click operation saved in the rule stored in the rule storage unit 151.

For example, in a case where the operation definition is value acquisition, the data circulation unit 164 acquires a value displayed on the UI of the existing system 140. Then, the data circulation unit 164 reflects the acquired value as it is in the additional UI displayed on the transparent web browser by the display control unit 163. Alternatively, the data circulation unit 164 processes or converts the acquired value and reflects the value in the additional UI.

In the value acquisition described above, the data circulation unit 164 determines whether the UI of the target existing system (e.g., existing system 140) supports accessibility APIs. In a case where the UI of the target existing system supports accessibility APIs, the data circulation unit 164 uses an accessibility API to acquire a value displayed on the UI of the existing system. In a case where the UI of the target existing system does not support accessibility APIs, the data circulation unit 164 acquires the value displayed on the UI of the existing system via a clipboard stored in the clipboard storage unit 152 by a copy operation with the keyboard on the UI of the existing system.

In a case where the operation definition is value setting, the data circulation unit 164 acquires a value displayed on the additional UI displayed on the transparent web browser by the display control unit 163. Then, the data circulation unit 164 reflects the acquired value as it is in the UI of the existing system 140.

In the value setting described above, the data circulation unit 164 determines whether the UI of the target existing system (e.g., existing system 140) supports accessibility APIs. In a case where the UI of the target existing system supports accessibility APIs, the data circulation unit 164 uses an accessibility API to reflect a value in the UI of the existing system. In a case where the UI of the target existing system does not support accessibility APIs, the data circulation unit 164 reflects the value in the UI of the existing system via the clipboard stored in the clipboard storage unit 152 by a paste operation with the keyboard on the UI of the existing system.

In a case where the operation definition is a click operation and the click operation is performed on the additional UI displayed on the transparent web browser by the display control unit 163, the data circulation unit 164 reflects the click operation on the UI of the existing system 140.

For example, the data circulation unit 164 determines whether the UI of the target existing system (e.g., existing system 140) supports accessibility APIs. In a case where the UI of the target existing system supports accessibility APIs, the data circulation unit 164 uses an accessibility API to reflect a click operation in the UI of the existing system. In a case where the UI of the target existing system does not support accessibility APIs, the data circulation unit 164 temporarily minimizes the entire transparent web browser. Then, the data circulation unit 164 reflects a click operation in the UI of the existing system by generating a click event at the coordinates at which the UI of the existing system is displayed.

FIG. 8 is an explanatory diagram illustrating an example of data circulation processing for circulating data between an existing UI and an additional UI. In the example in FIG. 8, the data circulation unit 164 circulates data between an existing UI and an additional UI with the use of an accessibility API and a virtual keyboard operation.

As described above, in a case where the UI augmentation is used for a web system, not only an existing UI but also an additional UI are present in the same DOM tree. Thus, data can be easily circulated with the use of a JavaScript API for operating a DOM. However, in a case where the screen of the existing system is implemented by WPF of Windows, Swing of Java, or the like, this screen does not have a DOM tree. A transparent web browser where the additional UI is displayed is completely independent of the screen of the existing system. Therefore, in a conventional method (a method using a JavaScript API), it is difficult to circulate data between an existing UI and an additional UI.

Thus, in order to support implementation of various systems, the data circulation unit 164 enables circulation of data between an existing UI and an additional UI by using the accessibly API and the virtual keyboard operation in combination.

As for the accessibly API, in a case where the data circulation unit 164 can use accessibly APIs, the data circulation unit 164 acquires an API for operating each UI constituting the system screen. The data circulation unit 164 can set a value for the UI or acquire a value from the UI by calling these APIs.

In the example in FIG. 8, first, the data circulation unit 164 acquires a value of an additional UI by calling a JavaScript API for the transparent web browser (step S80A-1). For example, the data circulation unit 164 can easily acquire the value of the additional UI by using a method "$("ext01").val( )".

Next, the data circulation unit 164 calls an API for setting a value of the accessibly API, and reflects the value acquired from the additional UI in the UI of the existing system (step S80A-2).

As for the virtual keyboard operation, as described above, in a case where the UI of the system is constructed by unique implementation, the data circulation unit 164 may not be able to use accessibly APIs. Even in such a case, the data circulation unit 164 can cause software to execute a copy or paste operation with the keyboard by a virtual keyboard operation. The data circulation unit 164 can circulate data between the existing UI and the additional UI via a clipboard.

In the example in FIG. 8, first, the data circulation unit 164 acquires a value of an additional UI, as in the case of the accessibly API (step S80B-1).

Next, the data circulation unit 164 sets the value acquired from the additional UI in the clipboard (step S80B-2).

Next, the data circulation unit 164 focuses on an existing UI to which data is desired to be circulated (step S80B-3). In other words, the existing UI to which data is desired to be circulated is an existing UI to which a user of the terminal device 100 wants to circulate data.

Next, the data circulation unit 164 executes a paste operation with the keyboard from the software (step S80B-4). That is, the keyboard is not operated by a human (user).

(Second Timing Generation Unit 165)

The second timing generation unit 165 determines a timing to redisplay an additional UI displayed by the display control unit 163 on the basis of whether a predetermined event has occurred on the system screen. For example, the second timing generation unit 165 uses, as inputs, the environment settings saved in the rule stored in the rule storage unit 151. Then, the second timing generation unit 165 monitors changes in the existing system 140 and gives an instruction on a timing at which the additional UI needs to be redisplayed. In this manner, the second timing generation unit 165 adjusts the timing to redisplay the additional UI. The second timing generation unit 165 can monitor changes in the existing system 140 with the use of a method such as UI Automation or global hook.

More specifically, in a case where an event set as a monitoring event included in the environment settings has been observed from a system window that matches the system determination conditions, the second timing generation unit 165 calls processing suitable for the type of the event.

As for the monitoring event and the called processing described above, the second timing generation unit 165 can execute at least one of the following four pieces of processing.

In the first processing, when a mouse wheel event occurs in a window of a target system (e.g., existing system 140), the second timing generation unit 165 calls the base point search unit 162 by using, as inputs, all the additional UI settings included in the corresponding system definition. Thus, the second timing generation unit 165 causes the display position of the additional UI to follow the change in the display position of the base point UI caused by scrolling with the mouse wheel.

In the second processing, when a window size change event of a target system (e.g., existing system 140) occurs, the second timing generation unit 165 changes the size of the corresponding transparent web browser such that the size of the web browser follows the size of the system window. After the size change, the second timing generation unit 165 calls the base point search unit 162 by using, as inputs, all the additional UI settings included in the corresponding system definition. Thus, the second timing generation unit 165 causes the display position of the additional UI to follow changes in the display position of the base point UI caused by changes in the size of the window.

In the third processing, when an update event such as reloading of drawing occurs in a window of a target system (e.g., existing system 140), the second timing generation unit 165 deletes all the additional UIs displayed on the corresponding transparent web browser. After deleting the additional UI, the second timing generation unit 165 calls the base point search unit 162 by using, as inputs, all the additional UI settings included in the corresponding system definition. Thus, the second timing generation unit 165 switches display of the additional UIs in accordance with a change in the display of the system screen.

In the fourth processing, when a mouse click event or a focus change event occurs in a window of a target system (e.g., existing system 140), the second timing generation unit 165 specifies the UI in which the corresponding event has occurred. In a case where the corresponding UI matches a base point UI registered as a monitoring target by the base point search unit 162, the base point search unit 162 is called by using, as an input, an additional UI setting including a base point definition corresponding to the base point UI. Thus, the second timing generation unit 165 switches display of the corresponding additional UI in accordance with a change in the value of the base point UI.

FIGS. 9A and 9B are explanatory diagrams illustrating examples of timing generation processing for generating a timing to redisplay an additional UI.

As described above, the transparent web browser where an additional UI is displayed is completely independent of the screen of the existing system 140. Thus, measures described below may be required. Note that, in a conventional user interface augmentation, an existing UI and an additional UI are present in the same DOM tree. For this reason, conventional user interface augmentations do not require consideration of the measures described below.

The first measure is to detect a change in the value of the base point UI and notify an additional UI (independent transparent web system) of the change in the value. The second measure is to delete (clear) a UI added to the transparent web system or to designate a timing of redrawing. In order to take such measures, the control unit 160 has the second timing generation unit 165.

A condition that "a certain value has been set for a base point UI" frequently appears as a display condition for an additional UI. In such a case, at the timing when a user changes the value of the base point UI, it is necessary to check the value of the base point UI, determine whether the value matches the display condition, and control display of the additional UI.

In conventional UI augmentations, a target of the UI augmentation is a web system. Thus, it is possible to easily acquire a change in the value of the base point UI by registering a listener for an event to be observed with the use of EventListener function in JavaScript. However, in the UI augmentation according to the implementation example, target existing systems include systems other than web systems. It is therefore not easy to register a listener for an event of an existing UI.

Thus, at the timing when a mouse click event or a focus change event occurs, the second timing generation unit 165 determines whether the existing UI that has been clicked or the existing UI where the focus change has occurred is a base point UI. In any system implementation, a mouse click or a focus change is an easily observed event.

In a case where it is determined that the existing UI that has been clicked or the existing UI where the focus change has occurred is a base point UI, the second timing generation unit 165 calls processing by the base point search unit 162 for the corresponding additional UI, and checks the display condition of the corresponding additional UI again. Thus, the second timing generation unit 165 notifies the additional UI of the timing at which the value of the base point UI may have been changed, thereby enabling display control for the additional UI. In this manner, the second timing generation unit 165 monitors a mouse click or a focus change, and gives notification that the value of the base point UI may have been changed.

As for the timing when the value of the base point UI may have been changed, a mouse click event or a focus change event does not always occur at the timing when the value of the base point UI is changed. It may turn out that the value of the base point UI has not been changed. Even in such a case, no inconvenience occurs in checking the display condition again. In a case where there is a possibility that another event other than a mouse click event and a focus change event occurs at the timing when the value of the base point UI is changed, the second timing generation unit 165 may monitor the other event. In a case where the other event occurs, the second timing generation unit 165 may give notification that the value of the base point UI may have been changed, as in the case of a mouse click or a focus change.

In addition, in a case where an accessibility API can be used to register a listener of an event such as a value change for the base point UI, the second timing generation unit 165 can also register a listener for each base point UI. When an event occurs, the second timing generation unit 165 can notify the corresponding additional UI of the timing when the value of the base point UI was changed.

In the example in FIG. 9A, a base point UI 91 and a corresponding additional UI 92 are displayed on a screen 90 of the existing system. The display condition of the additional UI 92 is a condition that "the value of the base point UI is "aaa"". In many cases, a mouse click event or a focus change event occurs at the timing when the value of the base point UI is changed. At the timing when the value of the base point UI 91 is changed, the second timing generation unit 165 detects the change in the value of the base point UI 91, and hides the additional UI 92.

On the other hand, in the example in FIG. 9B, the second timing generation unit 165 deletes (clears) all the UIs added to the transparent web browser, and newly performs display control.

In the conventional UI augmentation, an existing UI and an additional UI are displayed in the same web browser's DOM tree. Thus, the timing at which the additional UI is deleted (cleared) or redrawn is obvious.

For example, in a case where a web page on which an additional UI is displayed has been reloaded, all the DOM trees are deleted once, and a new DOM tree is reloaded. Thus, the additional UI is also deleted (cleared), the new DOM tree is called, and then a required additional UI is redrawn.

However, in the UI augmentation according to the implementation example, the existing UI is completely independent of the area in which the additional UI is displayed. Even in a case where the existing UI is reloaded, the additional UI remains as it is. Note that it is possible to switch between non-display and display by display control processing at the monitoring intervals. However, the additional UI cannot be reloaded. It is also possible to reload a new additional UI (that is, add a UI after deletion of the additional UI) each time without hiding the additional UI by the display control processing. In this case, an entry that has been input in the additional UI by a user is cleared at the monitoring intervals, and this makes the user interface augmentation unusable.

Thus, the second timing generation unit 165 allows an update (reload) event to be set freely (e.g., when an update button on the screen of the existing system is pressed, or when a tab is switched to another). Then, when an update event occurs, the second timing generation unit 165 deletes (clears) all the UIs added to the corresponding transparent web browser, and newly performs display control. Thus, the second timing generation unit 165 enables redrawing of an additional UI.

In the example in FIG. 9B, the base point UI 91 and the corresponding additional UI 92 are displayed on the screen 90 of the existing system. In this example, the entire scroll area is redrawn, and the base point UI 91 disappears. In a UI augmentation used for a conventional web system, the additional UI 92 is automatically deleted. However, in the UI augmentation according to the implementation example, the additional UI 92 is left as it is. The additional UI 92 is only hidden at best, and the additional UI 92 is not deleted (cleared). The second timing generation unit 165 applies new display control to the additional UI 92. The new display control will be described in detail below with reference to FIG. 14.

4. Flow of UI Augmentation Processing

Next, a procedure of UI augmentation processing by the terminal device 100 according to the embodiment will be described with reference to FIGS. 10, 11, 12, 13, 14, and 15.

Figure 10:
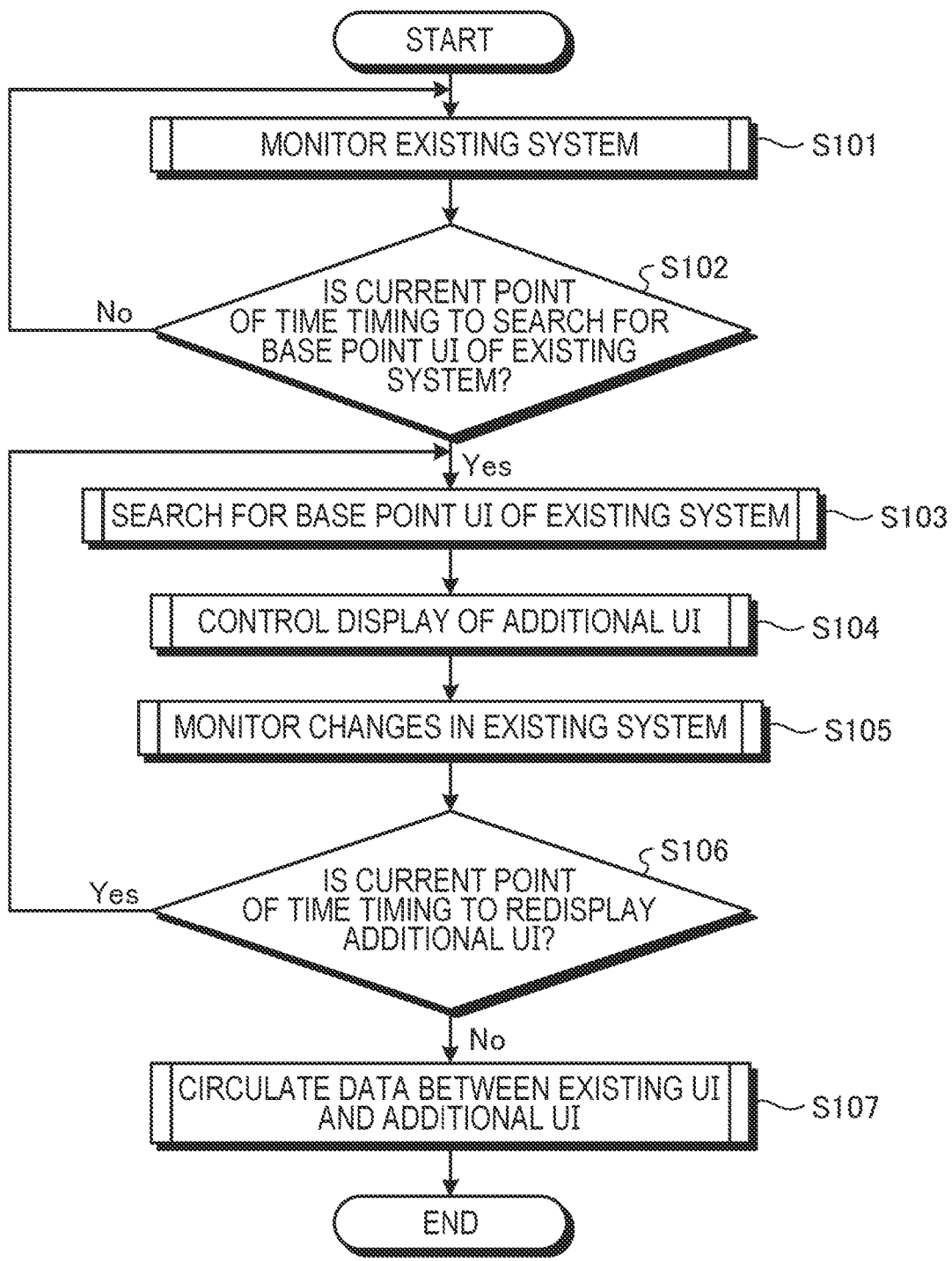
FIG. 10 is a flowchart illustrating an example of processing for extending a UI of a screen of an existing system, executed by a terminal device according to the embodiment.

FIG. 10 is a flowchart illustrating an example of processing for extending a UI of a screen of an existing system, executed by the terminal device 100 according to the embodiment.

As illustrated in FIG. 10, first, the first timing generation unit 161 of the terminal device 100 monitors an existing system (step S101). Monitoring of the existing system will be described in detail below with reference to FIG. 11.

Next, the base point search unit 162 of the terminal device 100 determines whether the current point of time is a timing to search for a base point UI of the existing system (step S102). In a case where it is determined that the current point of time is not the timing to search for a base point UI of the existing system (step S102: No), the processing procedure returns to step S101.

In a case where it is determined that the current point of time is the timing to search for a base point UI of the existing system (step S102: Yes), the base point search unit 162 searches for a base point UI of the existing system (step S103). The search for a base point UI of the existing system will be described in detail below with reference to FIG. 12.

Next, the display control unit 163 of the terminal device 100 controls display of an additional UI (step S104). The control of display of the additional UI will be described in detail below with reference to FIG. 13.

Next, the second timing generation unit 165 of the terminal device 100 monitors changes in the existing system (step S105). The monitoring of changes in the existing system will be described in detail below with reference to FIG. 14.

Next, the base point search unit 162 determines whether the current point of time is the timing to redisplay the additional UI (step S106). In a case where it is determined that the current point of time is the timing to redisplay the additional UI (step S106: Yes), the processing procedure returns to step S103.

In a case where it is determined that the current point of time is not the timing to redisplay the additional UI (step S106: No), the second timing generation unit 165 of the terminal device 100 circulates data between an existing UI and the additional UI (step S107). The circulation of data between the existing UI and the additional UI will be described in detail below with reference to FIG. 15.

Note that, in the example in FIG. 10, the terminal device 100 executes step S107 after steps S105 and S106, but the order is not limited thereto. The terminal device 100 may monitor changes in the existing system after circulation of data between the existing UI and the additional UI.

Figure 11:
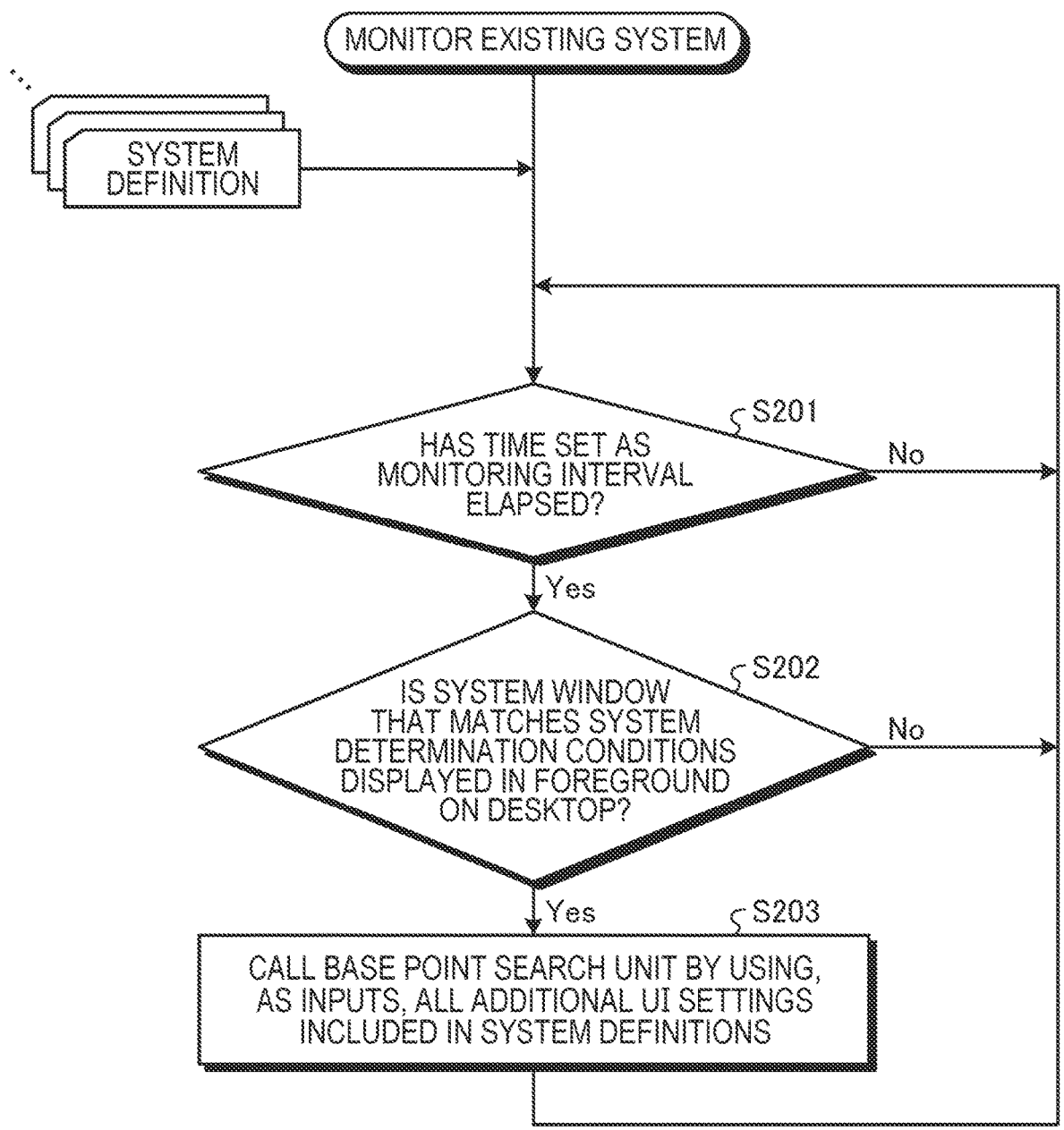
FIG. 11 is a flowchart illustrating an example of processing for monitoring an existing system, executed by the terminal device according to the embodiment.

FIG. 11 is a flowchart illustrating an example of processing for monitoring an existing system, executed by the terminal device 100 according to the embodiment. The first timing generation unit 161 of the terminal device 100 monitors the existing system in parallel for each system definition stored in the rule storage unit 151.

As illustrated in FIG. 11, first, the first timing generation unit 161 determines whether a time set as the monitoring interval has elapsed, on the basis of the system definition stored in the rule storage unit 151 (step S201). In a case where it is determined that the time set as the monitoring interval has not elapsed (step S201: No), the first timing generation unit 161 executes step S201 again.

In a case where it is determined that the time set as the monitoring interval has elapsed (step S201: Yes), the first timing generation unit 161 determines whether a system window that matches the system determination conditions is displayed in the foreground on the desktop (step S202). In a case where it is determined that a system window that matches the system determination conditions is not displayed in the foreground on the desktop (step S202: No), the processing procedure returns to step S201.

In a case where it is determined that a system window that matches the system determination conditions is displayed in the foreground on the desktop (step S202: Yes), the first timing generation unit 161 calls the base point search unit 162 by using, as inputs, all the additional UI settings included in the system definitions (step S203). In other words, the first timing generation unit 161 instructs the base point search unit 162 to search for a base point UI. Thus, the base point search unit 162 can determine whether the current point of time is the timing to search for a base point UI of the existing system.

Figure 12:
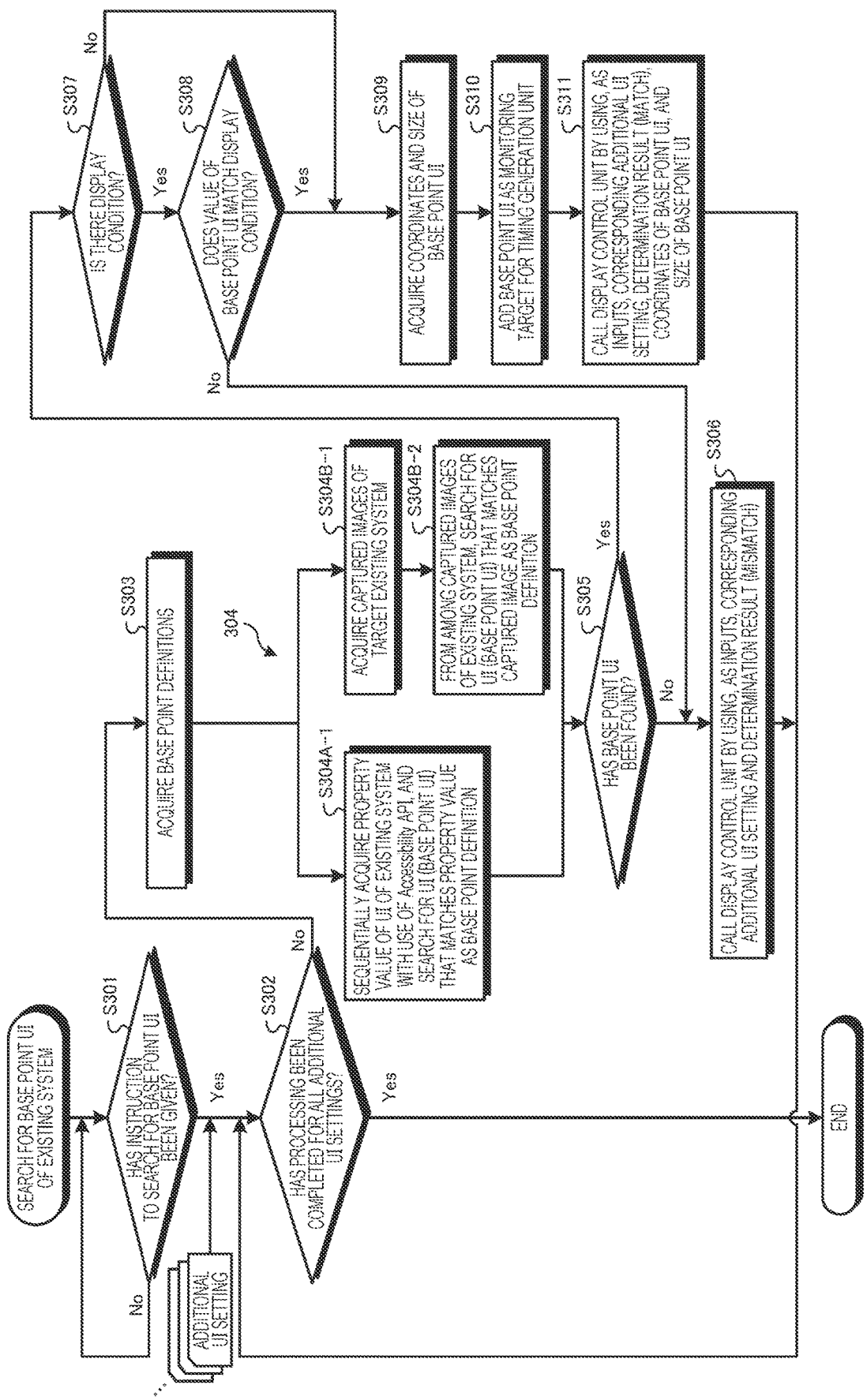
FIG. 12 is a flowchart illustrating an example of processing for searching for a base point UI of an existing system, executed by the terminal device according to the embodiment.

FIG. 12 is a flowchart illustrating an example of processing for searching for a base point UI of an existing system, executed by the terminal device 100 according to the embodiment. The base point search unit 162 of the terminal device 100 searches for a base point UI of the existing system for each additional UI setting stored in the rule storage unit 151.

As illustrated in FIG. 12, first, the base point search unit 162 determines whether an instruction to search for a base point UI has been given (step S301). In a case where it is determined that an instruction to search for a base point UI has not been given (step S301: No), the base point search unit 162 waits until the timing to search for a base point UI of the existing system. Then, the base point search unit 162 executes step S301 again.

In a case where it is determined that an instruction to search for a base point UI has been given (step S301: Yes), the base point search unit 162 determines whether the processing has been completed for all the additional UI settings (step S302). In a case where it is determined that the processing has been completed for all the additional UI settings (step S302: Yes), the processing procedure ends.

In a case where it is determined that the processing has not been completed for all the additional UI settings (step S302: No), the base point search unit 162 acquires base point definitions from the rule storage unit 151 (step S303).

Next, the base point search unit 162 searches for a base point UI on the basis of the acquired base point definitions (step S304). The base point search unit 162 searches for a base point UI in parallel for each base point definition.

In one example, the base point search unit 162 sequentially acquires a property value of a UI of the existing system with the use of an accessibility API, and searches for a UI (base point UI) that matches the property value as the base point definition (step S304A-1).

In another example, the base point search unit 162 acquires captured images of the target existing system (step S304B-1). Next, from among the captured images of the existing system, the base point search unit 162 searches for a UI (base point UI) that matches the captured image as the base point definition (step S304B-2).

Next, the base point search unit 162 determines whether a base point UI has been found (step S305). In a case where it is determined that no base point UI has been found (step S305: No), the display control unit 163 is called by using, as inputs, the corresponding additional UI setting and the determination result (mismatch). Then, the base point search unit 162 executes step S302 again.

In a case where it is determined that a base point UI has been found (step S305: Yes), the base point search unit 162 determines whether there is a display condition (step S307).

In a case where it is determined that there is a display condition (step S307: Yes), the base point search unit 162 determines whether the value of the base point UI matches the display condition (step S308). In other words, in a case where the base point search unit 162 has successfully acquired a display condition, the base point search unit 162 executes step S308. For example, the base point search unit 162 can acquire the value of the base point UI by the information processing (acquisition of a value) described above in relation to the data circulation unit 164.

In a case where it is determined that the value of the base point UI matches the display condition (step S308: Yes), the base point search unit 162 acquires the coordinates and size of the base point UI (step S309). In a case where it is determined that the value of the base point UI does not match the display condition (step S308: No), the processing procedure proceeds to step S306.

In a case where it is determined that there is no display condition (step S307: No), the processing procedure proceeds to step S309. In other words, in a case where the base point search unit 162 has failed to acquire a display condition, the base point search unit 162 executes step S309.

Next, the base point search unit 162 adds the base point UI as a monitoring target for the second timing generation unit 165 (step S310).

Next, the base point search unit 162 calls the display control unit 163 by using, as inputs, the corresponding additional UI setting, the determination result (match), the coordinates of the base point UI, and the size of the base point UI (step S311). Then, the base point search unit 162 executes step S302 again.

Figure 13:
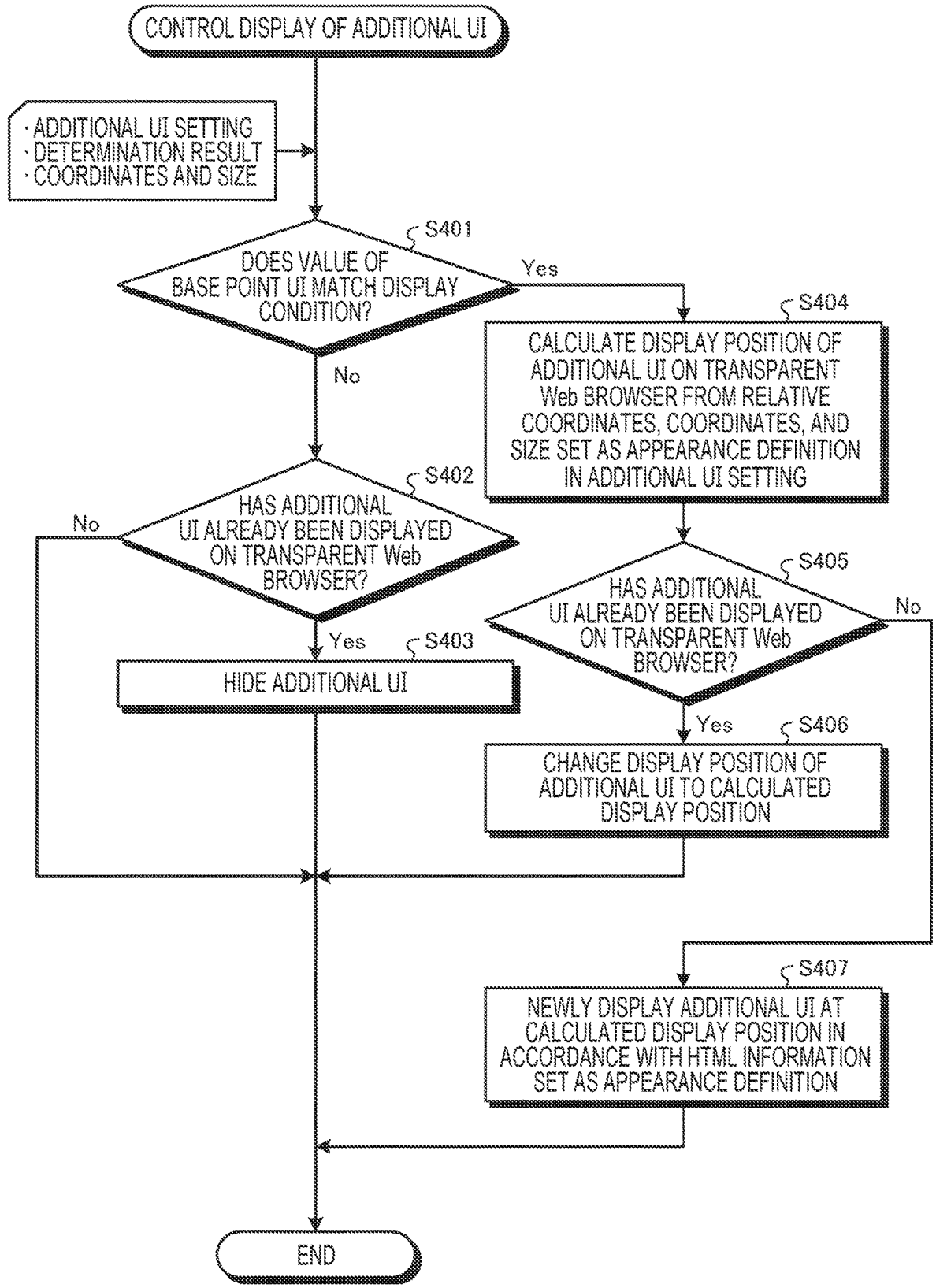
FIG. 13 is a flowchart illustrating an example of processing for controlling display of an additional UI, executed by the terminal device according to the embodiment.

FIG. 13 is a flowchart illustrating an example of processing for controlling display of an additional UI, executed by the terminal device 100 according to the embodiment. The display control unit 163 of the terminal device 100 controls display of the additional UI on the basis of an additional UI setting, a result (match or mismatch) of determination by the base point search unit 162, and the coordinates and size of a base point UI.

As illustrated in FIG. 13, first, the display control unit 163 determines whether a value of the base point UI matches a display condition (step S401). In a case where it is determined that the value of the base point UI does not match the display condition (step S401: No), the display control unit 163 determines whether the additional UI has already been displayed on the transparent web browser (step S402). In a case where it is determined that the additional UI has not yet been displayed on the transparent web browser (step S402: No), the processing procedure ends.

In a case where it is determined that the additional UI has already been displayed on the transparent web browser (step S402: Yes), the display control unit 163 hides the additional UI (step S403).

In a case where it is determined in step S401 that the value of the base point UI matches the display condition (step S401: Yes), the display control unit 163 calculates the display position of the additional UI on the transparent web browser from the relative coordinates, coordinates, and size set as the appearance definition in the additional UI setting (step S404).

Next, the display control unit 163 determines whether the additional UI has already been displayed on the transparent web browser (step S405). In a case where it is determined that the additional UI has already been displayed on the transparent web browser (step S405: Yes), the display control unit 163 changes the display position of the additional UI to the calculated display position (step S406).

In a case where it is determined that the additional UI has not yet been displayed on the transparent web browser (step S405: No), the display control unit 163 newly displays the additional UI at the calculated display position in accordance with HTML information set as the appearance definition stored in the rule storage unit 151 (step S407).

Figure 14:
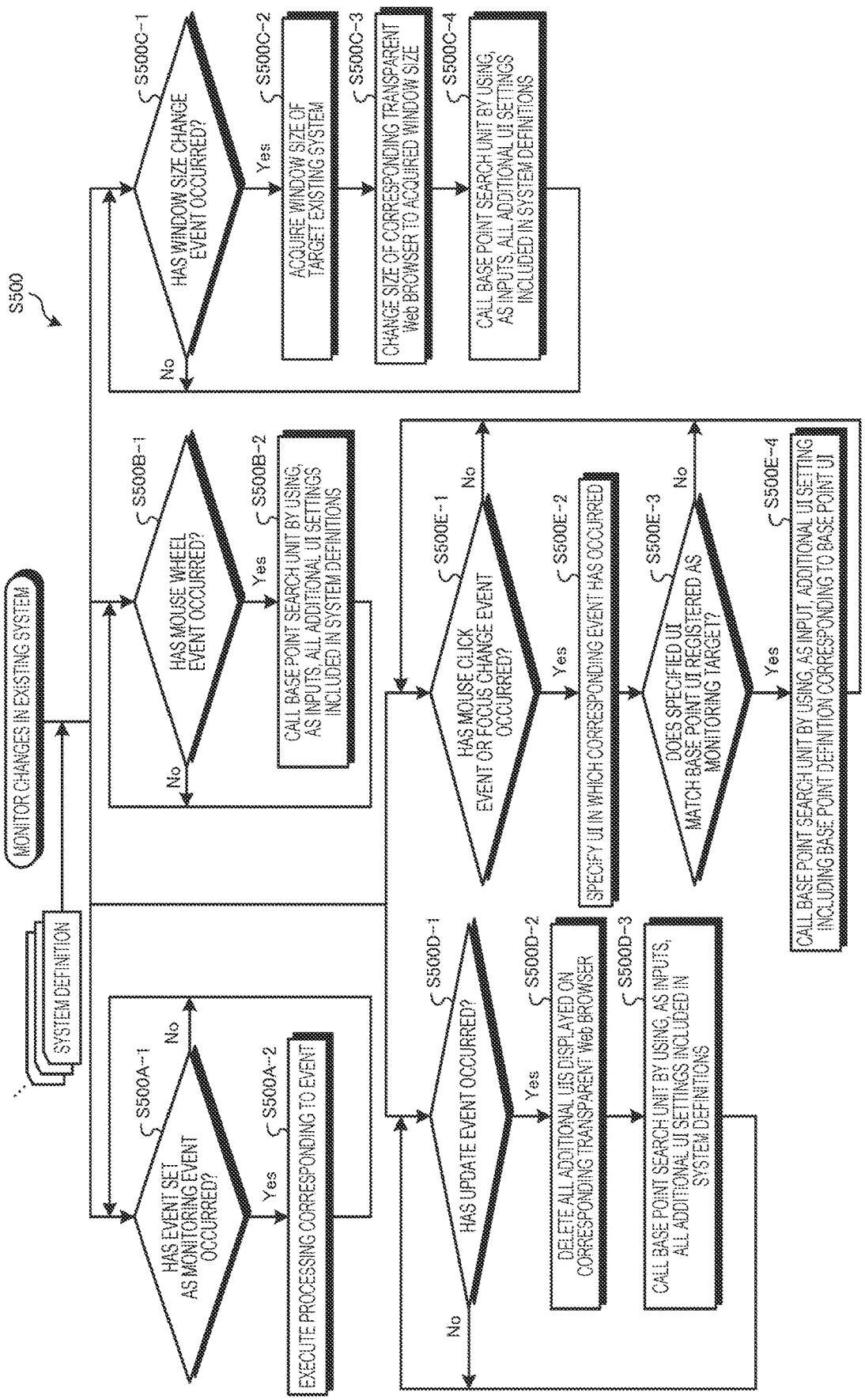
FIG. 14 is a flowchart illustrating an example of processing for monitoring changes in an existing system, executed by the terminal device according to the embodiment.

FIG. 14 is a flowchart illustrating an example of processing for monitoring changes in an existing system, executed by the terminal device 100 according to the embodiment. The second timing generation unit 165 of the terminal device 100 executes step S500 of monitoring changes in the existing system in parallel for each system definition stored in the rule storage unit 151.

In one example, the second timing generation unit 165 determines whether an event set as a monitoring event has occurred (step S500A-1). In a case where it is determined that the event set as a monitoring event has not occurred (step S500A-1: No), the second timing generation unit 165 executes step S500A-1 again.

In a case where it is determined that the event set as a monitoring event has occurred (step S500A-1: Yes), the second timing generation unit 165 executes processing corresponding to the event (step S500A-2). Then, the second timing generation unit 165 executes step S500A-1 again.

In another example, the second timing generation unit 165 determines whether a mouse wheel event has occurred (step S500B-1). In a case where it is determined that no mouse wheel event has occurred (step S500B-1: No), the second timing generation unit 165 executes step S500B-1 again.

In a case where it is determined that a mouse wheel event has occurred (step S500B-1: Yes), the second timing generation unit 165 calls the base point search unit 162 by using, as inputs, all the additional UI settings included in the system definitions (step S500B-2). In other words, the second timing generation unit 165 instructs the base point search unit 162 to search for a base point UI. Thus, the base point search unit 162 can determine whether the current point of time is the timing to redisplay the additional UI. Then, the second timing generation unit 165 executes step S500B-1 again.

In still another example, the second timing generation unit 165 determines whether a window size change event has occurred (step S500C-1). In a case where it is determined that a window size change event has not occurred (step S500C-1: No), the second timing generation unit 165 executes step S500C-1 again.

In a case where it is determined that a window size change event has occurred (step S500C-1: Yes), the second timing generation unit 165 acquires the window size of the target existing system (step S500C-2).

Next, the second timing generation unit 165 changes the size of the corresponding transparent web browser to the acquired window size (step S500C-3).

Next, the second timing generation unit 165 calls the base point search unit 162 by using, as inputs, all the additional UI settings included in the system definitions (step S500C-4). As a result, the base point search unit 162 can determine whether the current point of time is the timing to redisplay the additional UI. Then, the second timing generation unit 165 executes step S500C-1 again.

In still another example, the second timing generation unit 165 determines whether an update event has occurred (step S500D-1). In a case where it is determined that no update event has occurred (step S500D-1: No), the second timing generation unit 165 executes step S500D-1 again.

In a case where it is determined that an update event has occurred (step S500D-1: Yes), the second timing generation unit 165 deletes all the additional UIs displayed on the corresponding transparent web browser (step S500D-2).

Next, the second timing generation unit 165 calls the base point search unit 162 by using, as inputs, all the additional UI settings included in the system definitions (step S500D-3). As a result, the base point search unit 162 can determine whether the current point of time is the timing to redisplay the additional UI. Then, the second timing generation unit 165 executes step S500D-1 again.

In still another example, the second timing generation unit 165 determines whether a mouse click event or a focus change event has occurred (step S500E-1). In a case where it is determined that neither a mouse click event nor a focus change event has occurred (step S500E-1: No), the second timing generation unit 165 executes step S500E-1 again.

In a case where it is determined that a mouse click event or a focus change event has occurred (step S500E-1: Yes), the second timing generation unit 165 specifies the UI in which the corresponding event has occurred (step S500E-2).

Next, the second timing generation unit 165 determines whether the specified UI matches the base point UI registered as a monitoring target (step S500E-3). In a case where it is determined that the specified UI does not match the base point UI registered as a monitoring target (step S500E-3: No), the second timing generation unit 165 executes step S500E-1 again.

In a case where it is determined that the specified UI matches the base point UI registered as a monitoring target (step S500E-3: Yes), the second timing generation unit 165 calls the base point search unit 162 by using, as an input, an additional UI setting including a base point definition corresponding to the base point UI (step S500E-4). As a result, the base point search unit 162 can determine whether the current point of time is the timing to redisplay the additional UI. Then, the second timing generation unit 165 executes step S500E-1 again.

FIG. 15 is a flowchart illustrating an example of processing for circulating data between an existing UI and an additional UI, executed by the terminal device 100 according to the embodiment. The data circulation unit 164 of the terminal device 100 executes step S600 of circulating data between the existing UI and the additional UI in parallel for each UI behavior indicated by an operation definition stored in the rule storage unit 151.

As for acquisition of a value, the data circulation unit 164 determines whether a UI of the existing system supports accessibility APIs (step S600A-1).

In a case where it is determined that the UI of the existing system supports accessibility APIs (step S600A-1: Yes), the data circulation unit 164 uses an accessibility API to acquire a value displayed on the UI of the existing system designated in the operation definition (step S600A-2).

Next, the data circulation unit 164 processes and converts the acquired value as necessary, and reflects the acquired value in the additional UI displayed on the transparent web browser designated in the operation definition (step S600A-3).

In a case where it is determined in step S600A-1 that the UI of the existing system does not support accessibility APIs (step S600A-1: No), the data circulation unit 164 focuses on a UI of the existing system designated in the operation definition (step S600A-4).

Next, the data circulation unit 164 executes a copy operation (e.g., Ctrl-A or Ctrl-C) with the keyboard from software (step S600A-5). That is, the keyboard is not operated by a human.

Next, the data circulation unit 164 acquires a value of a clipboard from the clipboard storage unit 152 (step S600A-6). Then, the data circulation unit 164 executes step S600A-3.

As for setting of a value, the data circulation unit 164 acquires a value displayed on the additional UI displayed on the transparent web browser designated in the operation definition (step S600B-1).

Next, the data circulation unit 164 determines whether a UI of the existing system supports accessibility APIs (step S600B-2).

In a case where it is determined that the UI of the existing system supports accessibility APIs (step S600B-2: Yes), the data circulation unit 164 uses an accessibility API to reflect the acquired value in the UI of the existing system designated in the operation definition (step S600B-3).

In a case where it is determined that the UI of the existing system does not support accessibility APIs (step S600B-2: No), the data circulation unit 164 focuses on the UI of the existing system designated in the operation definition (step S600B-4).

Next, the data circulation unit 164 sets the acquired value in the clipboard (step S600B-5).

Next, the data circulation unit 164 executes a paste operation (e.g., Ctrl-V) with the keyboard from software (step S600B-6). That is, the keyboard is not operated by a human.

As for a click operation, the data circulation unit 164 determines whether a UI of the existing system supports accessibility APIs (step S600C-1).

In a case where it is determined that the UI of the existing system supports accessibility APIs (step S6000-1: Yes), the data circulation unit 164 uses an accessibility API to reflect the click operation in the UI of the existing system designated in the operation definition (step S600C-2).

In a case where it is determined that the UI of the existing system does not support accessibility APIs (step S600C-1: No), the data circulation unit 164 temporarily minimizes the entire transparent web browser (step S600C-3).

Next, the data circulation unit 164 generates a click event at the coordinates at which the UI of the existing system is displayed (step S600C-4).

5. Effects

As described above, the user interface augmentation system 1 according to the embodiment includes the base point search unit 162 and the display control unit 163.

In the user interface augmentation system 1 according to the embodiment, the base point search unit 162 searches a system screen for a base point UI serving as a base point for display of an additional user interface (UI) to be added to the system screen. Furthermore, in the user interface augmentation system 1 according to the embodiment, the display control unit 163 displays a new screen with a transparent background in such a way as to overlap the system screen, and displays the additional UI at a position based on the base point UI on the new screen.

Thus, the user interface augmentation system 1 according to the embodiment can apply a user interface augmentation to a wide range of systems.

In addition, in the user interface augmentation system 1 according to the embodiment, a new screen independent of the system is displayed in such a way as to overlap the system screen.

Thus, the user interface augmentation system 1 according to the embodiment can provide a user interface augmentation that can be applied regardless of the implementation of the system.

Furthermore, in the user interface augmentation system 1 according to the embodiment, the base point search unit 162 searches for a base point UI on the basis of a property value of the base point UI used in an accessibility API or a captured image of the system screen.

Thus, the user interface augmentation system 1 according to the embodiment can search for a base point UI from a system screen having no DOM tree.

In addition, the user interface augmentation system 1 according to the embodiment includes the data circulation unit 164 that circulates data between an existing UI on the system screen and an additional UI by using an accessibility API or a virtual keyboard operation.

Thus, the user interface augmentation system 1 according to the embodiment can reflect contents of an additional UI in a UI of a system screen having no DOM tree.

In addition, the user interface augmentation system 1 according to the embodiment includes the first timing generation unit 161 that monitors the system and determines a first timing to search the system screen for a base point UI on the basis of whether the system screen is visibly displayed. Furthermore, in the user interface augmentation system 1 according to the embodiment, the base point search unit 162 searches for a base point UI on the basis of the first timing determined by the first timing generation unit 161.

Thus, the user interface augmentation system 1 according to the embodiment can search for a base point UI at an appropriate timing.

In addition, the user interface augmentation system 1 according to the embodiment includes the second timing generation unit 165 that monitors changes in the system and determines a second timing to redisplay the additional UI displayed by the display control unit 163 on the basis of whether a predetermined event has occurred on the system screen.

Thus, the user interface augmentation system 1 according to the embodiment can redisplay an additional UI at an appropriate timing.

6. Other Embodiments

The user interface augmentation system 1 according to the embodiment described above may be implemented in various different forms other than the embodiment described above. Thus, other embodiments of the user interface augmentation system 1 will be described below.

[6-1. Performance Subject of UI Augmentation Processing by Terminal Device]

The content providing device 200 may perform a part of the processing performed by the terminal device 100 in the embodiment described above. For example, the content providing device 200 may perform all or part of the information processing described above in relation to the first timing generation unit 161, the base point search unit 162, and the second timing generation unit 165.

For example, the existing system 140 may be installed on the content providing device 200. In this case, the content providing device 200 may perform the information processing described above in relation to the first timing generation unit 161, the base point search unit 162, and the second timing generation unit 165. However, it is assumed that the UI of the existing system 140 is present in the terminal device 100. The terminal device 100 can perform the information processing described above in relation to the display control unit 163 and the data circulation unit 164 via the UI.

As described above with reference to FIG. 4, the user interface augmentation system 1 includes the terminal device 100 and the content providing device 200. The content providing device 200 may share a part of the information processing described above in relation to the first timing generation unit 161, the base point search unit 162, and the second timing generation unit 165.

7. Others

Furthermore, among the processing described in the above embodiment, a part of the processing described as being automatically performed can also be manually performed. Alternatively, all or part of the processing described as being performed manually can be automatically performed by a known method. In addition, the above-described processing procedures, specific names, and information including various types of data and parameters described in the document and illustrated in the drawings can be freely changed unless otherwise specified. For example, the various types of information illustrated in the drawings are not limited to the illustrated information.

In addition, each component of each device that has been illustrated is functionally conceptual, and is not necessarily physically configured as illustrated. That is, a specific form of distribution and integration of individual devices is not limited to the illustrated form, and all or a part of the configuration can be functionally or physically distributed and integrated in any unit according to various loads, usage conditions, and the like.

For example, a part of or the entire storage unit 150 illustrated in FIG. 4 may be held in a storage server or the like instead of being held by the terminal device 100. In this case, the terminal device 100 accesses the storage server and acquires various types of information such as display conditions.

8. Hardware Configuration

FIG. 16 is a diagram illustrating an example of a hardware configuration. The terminal device 100 and the content providing device 200 according to the embodiment described above are implemented using, for example, a computer 1000 having a configuration as illustrated in FIG. 16.

FIG. 16 illustrates an example of the computer in which the terminal device 100 and the content providing device 200 are implemented by performing a program. The computer 1000 includes, for example, a memory 1010 and a CPU 1020. The computer 1000 further includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines processing by the terminal device 100 and the content providing device 200 is implemented as the program module 1093 in which a code performable by the computer 1000 is described. The program module 1093 is stored in, for example, the hard disk drive 1090. For example, the program module 1093 for performing processing similar to the functional configuration in the terminal device 100 or the content providing device 200 is stored in the hard disk drive 1090. Note that the hard disk drive 1090 may be replaced with a solid state drive (SSD).

Furthermore, setting data used in the processing of the embodiment described above is stored, for example, in the memory 1010 or the hard disk drive 1090 as the program data 1094. Then, the CPU 1020 reads and performs the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (e.g., LAN or WAN). Then, the program module 1093 and the program data 1094 may be read by the CPU 1020 from the other computer via the network interface 1070.

Although some embodiments of the present application have been described above in detail with reference to the drawings, these are merely examples, and the present invention is not limited to specific examples. The features described in the present specification can be implemented in other forms with various modifications and improvements on the basis of knowledge of those skilled in the art, including the aspects described in the section "Description of Embodiments".

Furthermore, the "sections", "modules", and "units" described above can be read as "means", "circuits", or the like. For example, the display control unit can be read as display control means or a display control circuit.

REFERENCE SIGNS LIST

1 User interface augmentation system
100 Terminal device
110 Communication unit
120 Input unit
130 Output unit
140 Existing system
150 Storage unit
151 Rule storage unit
152 Clipboard storage unit
160 Control unit
161 First timing generation unit
162 Base point search unit
163 Display control unit
164 Data circulation unit
165 Second timing generation unit
200 Content providing device

The invention claimed is:

1. A user interface augmentation system comprising:
a memory; and
a processor coupled to the memory and configured to perform operations comprising:
   searching a system screen of a first application for a base point user interface (UI) object that is presented in the system screen, and has been specified as a base point for positioning display of an additional UI object overlaid over a presentation of the system screen of the first application;
   overlaying, over the system screen, a new screen of a second application that presents the additional UI object with a transparent background of the second application, wherein the second application is operationally independent of the first application; and
   positioning the additional UI object at a display position based on a presentation location of the base point UI object in the presentation of the system screen identified in the search of the system screen.

2. The user interface augmentation system of claim 1, wherein searching the system screen of the first application for the base point UI object includes searching for the base point UI object on the basis of a property value of a base point UI used in an accessibility API or a captured image of the system screen.

3. The user interface augmentation system of claim 1, wherein the operations further comprise circulating data between an existing UI on the system screen and an additional UI by using an accessibility Application Programming Interface (API) or a virtual keyboard operation.

4. The user interface augmentation system of claim 1, wherein the operations further comprise:
monitoring the system; and
determining a first timing to search the system screen for the base point UI object on the basis of whether the system screen is visibly displayed,
wherein searching the system screen of the first application for the base point UI object includes searching for the base point UI object on the basis of the determined first timing.

5. The user interface augmentation system of claim 1, wherein the operations further comprise:
monitoring changes in the system; and
determining a second timing to redisplay the additional UI object positioned at the display position on the basis of whether a predetermined event has occurred on the system screen.

6. A user interface augmentation method performed by a computer, the method comprising:
searching a system screen of a first application for a base point user interface (UI) object that is presented in the system screen, and has been specified as a base point for positioning display of an additional UI object overlaid over a presentation of the system screen of the first application;

overlaying, over the system screen, a new screen of a second application that presents the additional UI object with a transparent background of the second application, wherein the second application is operationally independent of the first application; and positioning the additional UI object at a display position based on a presentation location of the base point UI object in the presentation of the system screen identified in the search of the system screen.

7. A non-transitory computer readable storage medium having a user interface augmentation program stored thereon that, when executed by a processor, causes the processor to perform operations comprising:

searching a system screen of a first application for a base point user interface (UI) object that is presented in the system screen, and has been specified as a base point for positioning display of an additional UI object overlaid over a presentation of the system screen of the first application;

overlaying, over the system screen, a new screen of a second application that presents the additional UI object with a transparent background of the second application, wherein the second application is operationally independent of the first application; and positioning the additional UI object at a display position based on a presentation location of the base point UI object in the presentation of the system screen identified in the search of the system screen.

\* \* \* \* \*